(12) United States Patent
Betson

(10) Patent No.: US 9,771,695 B2
(45) Date of Patent: Sep. 26, 2017

(54) TRAFFIC CONE DISPENSING AND RETRIEVING APPARATUS

(71) Applicant: Simon Betson, Athy (IE)

(72) Inventor: Simon Betson, Athy (IE)

(*) Notice: Subject to any disclaimer, the term of this patent is extended or adjusted under 35 U.S.C. 154(b) by 246 days.

(21) Appl. No.: 14/249,537

(22) Filed: Apr. 10, 2014

(65) Prior Publication Data

US 2014/0308102 A1 Oct. 16, 2014

(30) Foreign Application Priority Data

Apr. 10, 2013 (GB) .................................. 1306546.1

(51) Int. Cl.
*E01F 9/70* (2016.01)
*B60P 1/44* (2006.01)

(52) U.S. Cl.
CPC .............. *E01F 9/70* (2016.02); *B60P 1/4485* (2013.01)

(58) Field of Classification Search
CPC ......... E01F 9/014; E01F 9/016; E01F 9/0165; E01F 9/70; B60P 1/44; B60P 1/4485; B60P 1/5438
See application file for complete search history.

(56) References Cited

U.S. PATENT DOCUMENTS

| | | | | |
|---|---|---|---|---|
| 3,176,861 A * | 4/1965 | Paul | ...................... | B60P 1/5457 212/228 |
| 3,177,027 A * | 4/1965 | Paul | ...................... | B60P 1/5457 294/102.1 |
| 3,750,900 A * | 8/1973 | Piercey | ................... | E01F 9/014 414/503 |
| 5,244,334 A * | 9/1993 | Akita | ...................... | E01F 9/014 198/373 |
| 7,225,816 B2 * | 6/2007 | Byers | .................... | B08B 9/0826 134/104.2 |
| 7,300,522 B2 * | 11/2007 | Feistmantl | ............... | B08B 1/02 134/124 |
| 7,846,263 B1 * | 12/2010 | Marcantel | ............... | B08B 9/093 134/104.2 |
| 8,979,465 B2 * | 3/2015 | Brown | .................... | B66F 9/065 414/518 |

(Continued)

FOREIGN PATENT DOCUMENTS

EP 0501106 A1 1/1992
GB 2268772 A 1/1994

(Continued)

*Primary Examiner* — Glenn Myers
(74) *Attorney, Agent, or Firm* — Bishop Diehl & Lee, Ltd.

(57) ABSTRACT

Apparatus for dispensing cones onto a surface and for retrieving cones from the surface includes a cone transfer device having a tower with a platform moveable to and from a lower transfer position for dispensing and retrieving cones from the surface. The platform is movable in a vertical direction between the lower transfer position and an upper transfer position for receiving a stack of cones from a storage area and for returning a stack of cones to the storage area. The tower includes a device for holding one or more cones in an elevated position and for releasing cones onto and receiving cones from the platform in the elevated position. The apparatus may include a lamp transfer device for attaching a lamp unit to a cone when the cone is dispensed and for removing the lamp unit from the cone when the cone is retrieved.

13 Claims, 26 Drawing Sheets

(56) References Cited

U.S. PATENT DOCUMENTS

2006/0291957 A1* 12/2006 Lidster .................... E01F 9/014
404/73
2010/0322749 A1* 12/2010 Rowland ................ B65F 3/041
414/408

FOREIGN PATENT DOCUMENTS

| GB | 2396649 A | 6/2004 | | |
|----|-----------|--------|---|---|
| GB | 2419914 A | 10/2006 | | |
| GB | 2462089 A | 1/2010 | | |
| GB | EP 2163689 A2 * | 3/2010 | ............. | E01F 9/014 |
| GB | 2479558 A * | 10/2011 | ............. | E01C 23/09 |
| WO | 2006048680 A1 | 5/2006 | | |

* cited by examiner

TRAFFIC CONE DISPENSING AND RETRIEVING APPARATUS

CROSS-REFERENCE TO RELATED APPLICATIONS

This application claims the benefit of Great Britain Patent Application Serial No. 1306546.1 filed on Apr. 10, 2013.

TECHNICAL FIELD OF THE INVENTION

This invention relates to apparatus for dispensing traffic cones from a vehicle onto a road surface and for retrieving the cones from the road surface onto the vehicle.

BACKGROUND OF THE INVENTION

Traffic cones are used to provide temporary traffic control, for example when carrying out road repairs or improvements or following an accident. When large numbers of traffic cones are required, for example to create temporary lanes on a motorway, manually placing the cones along the road and later picking up the cones is time consuming and dangerous due to the close proximity of moving traffic. Also, the cones are heavy and awkward to handle making the work of manually placing the cones on the road and picking the cones up strenuous with the risk of injury.

There is a need for apparatus that can dispense cones onto a road surface and retrieve cones from a road surface that avoids manually placing the cones on the road surface and picking the cones up from the road surface.

SUMMARY OF THE INVENTION

In one aspect, the invention provides apparatus for dispensing cones onto a surface and for retrieving cones from the surface, the apparatus including a cone transfer device for transferring cones between a vehicle and the surface.

The apparatus may comprise a tower having a platform moveable to and from a lower transfer position for dispensing cones onto the road and for retrieving cones from the road. The platform may be movable between the lower transfer position and an upper transfer position for receiving cones from a storage area and for returning cones to the storage area. The upper transfer position may be located above, preferably substantially directly above the lower transfer position. The upper transfer position may be spaced substantially vertically above the lower transfer position.

The platform may receive a stack of cones from the storage area. The apparatus may include a device for releasing cones from the stack onto the platform individually or in multiples of two or more cones.

In one embodiment, the device comprises one or more gripping fingers. The gripping fingers may be movable between a closed position and an open position. The gripping device may retain cones in an elevated position from which cones can be released onto the platform individually or in multiples of two or more cones. Sets of gripping fingers may be provided for retaining individual cones in the elevated position.

In another embodiment, the device comprises on or more clamping bars. The clamping bars may be movable between a closed position and an open position. The clamping device may retain cones in an elevated position from which cones can be released onto the platform individually or in multiples of two or more cones.

The apparatus may be provided with a lamp transfer device for attaching a lamp unit to a cone when the cone is dispensed and for removing the lamp unit from the cone when the cone is retrieved.

The apparatus may be provided with a cone washing device for washing a cone when the cone is retrieved and/or when the cone is dispensed.

The platform may include an elevator for positioning the cone for attaching and removing the lamp unit and/or for washing the cone. The elevator may adjust a vertical position of the cone. The elevator may adjust an angular position of the cone. The elevator may lift and rotate the cone.

The elevator may be configured to engage a hole in the base of a cone. The engagement of the elevator in the hole may assist in securing the elevator to the cone and/or in positioning the cone on the platform. The portion of the elevator engaging in the hole and/or the hole may taper in towards the top of the base.

The apparatus may be mounted on a vehicle or a trailer towed by a vehicle. The tower may be movable transverse to the direction of movement of the vehicle.

The apparatus may include a device for aligning the platform with a cone to be retrieved. The alignment device may comprise guide bars defining a channel for guiding a cone towards the platform.

The apparatus may include a device for tilting a cone to be retrieved. The tilting device may comprise one or more tilt bars configured to engage an upper end of the cone to tilt the cone for retrieving the cone onto the platform.

The apparatus may include a device for retrieving a cone onto the platform. The retrieving device may engage an underside of a tilted cone and transfer the cone onto the platform.

In another aspect, the invention provides apparatus for dispensing cones onto a surface and for retrieving cones from the surface, the apparatus including a lamp transfer device for attaching a lamp unit to a cone and for retrieving the lamp unit from the cone.

The apparatus may include any feature of apparatus according to any other aspect of the invention.

In another aspect, the invention provides apparatus for dispensing cones onto a surface and for retrieving cones from the surface, the apparatus including a cone washing device for washing a cone.

The apparatus may include any feature of apparatus according to any other aspect of the invention.

In another aspect, the invention provides apparatus for dispensing cones onto a surface and for retrieving cones from the surface, the apparatus including one or more of a cone transfer device for transferring cones between a vehicle and the surface, a lamp transfer device for attaching a lamp unit to a cone and for retrieving the lamp unit from the cone, and a cone washing device for washing a cone The apparatus may include any feature of apparatus according to any other aspect of the invention.

In another aspect, the invention provides a cone having a base and a body upstanding from the base, wherein the base is configured to provide access between the bases of stacked cones.

The base may be provided with one or more spacer formations for co-operating with the base of another cone to provide access between the bases. The base may have an underside and topside. Each spacer formation may be provided on the underside of the base. Alternatively, each spacer formation may be provided on the topside of the base.

In another aspect, the invention provides a cone having a base and a body upstanding from the base, wherein the cone is provided with a light unit at an upper end of the body.

The light unit may be battery powered. The cone may be configured to interconnect light units of stacked cones. In this way, cones can be connected to a common power source for charging the batteries when the cones are stacked.

The light unit may include a housing for a light source. The housing may be a part of the body of the cone. The housing may form the upper end of the body. The housing may be made of a light transmitting material. The housing may be made of transparent or translucent plastic. The light source may be a light module received within the housing. The light module may be detachable.

In another aspect the invention provides a cone having a base and body, wherein the base is offset relative to the body.

Preferably the base is offset relative to a vertical axis through the body. It may be that the base protrudes from the body to a greater extent on at least one side of the body. When setting the cone down onto the road, for example to close off a lane, the offset cone base can be placed on the road with a protruding side of the base facing in towards the closed lane. As a result, the possibility of the base being driven over by passing traffic in the live lane is reduced compared to a regular based cone where the protruding base is not in the drivers line of vision, leaving it prone to being knocked over.

These and other features, benefits and advantages of the invention according to each of the aspects will be apparent from the description of exemplary embodiments with reference to the accompanying drawings, wherein:

DETAILED DESCRIPTION

Figure 1:
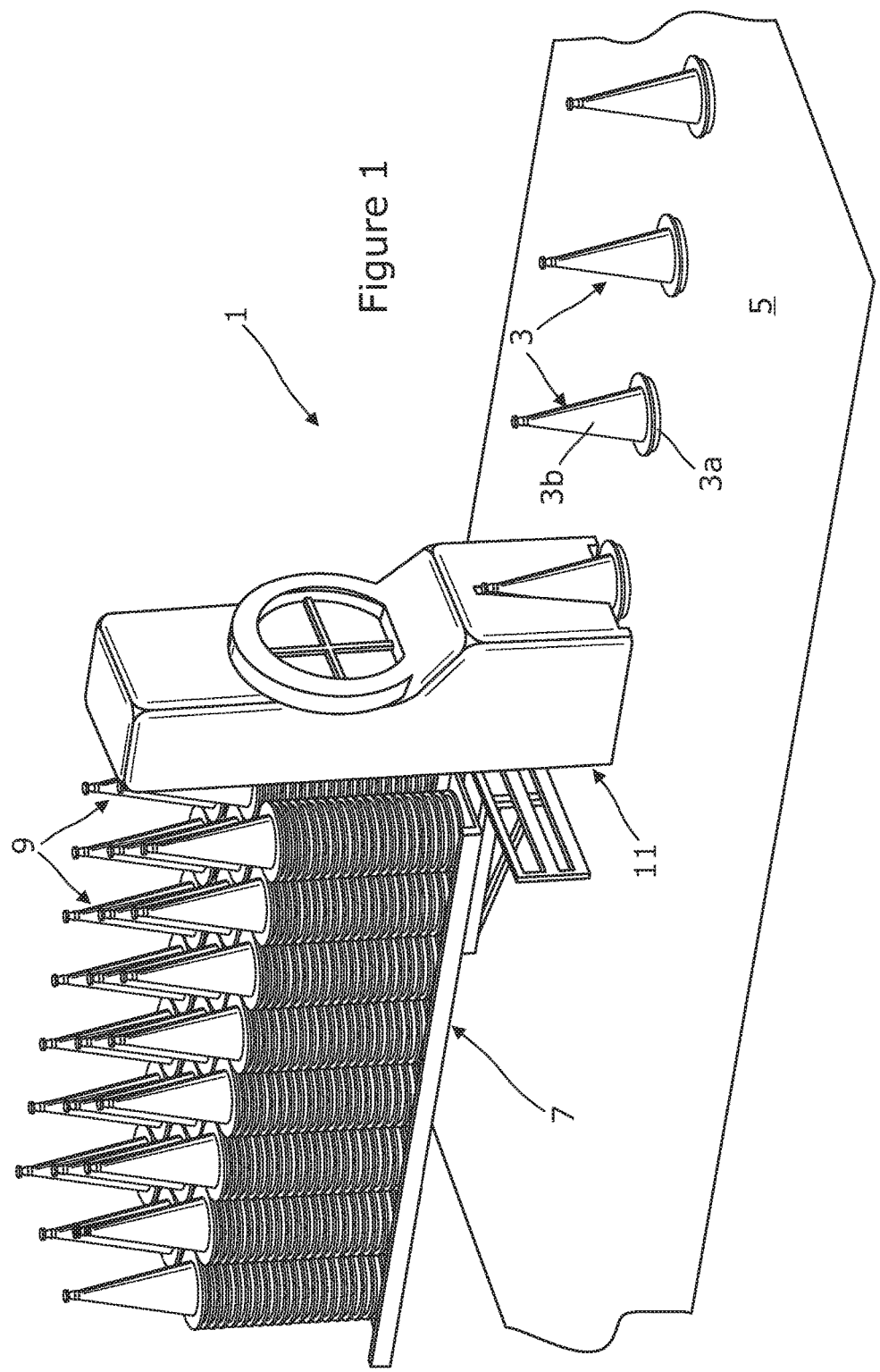
FIG. 1 is a diagrammatic perspective view of apparatus embodying the invention with the tower in a mid-position.

Referring first to FIGS. 1 to 14 of the drawings, apparatus 1 for dispensing cones 3 onto a road 5 or similar surface and retrieving the cones 3 from the road 5 is shown.

Each cone 3 has a base 3a and a conical body 3b upstanding from the base 3a. The body 3b is hollow and can be accessed through a central hole in the base 3a. The base 3a may be circular or substantially circular in plan view.

The apparatus 1 is mounted at a rear end of a flat bed storage area 7 on which stacks 9 of cones 3 are stored. The flat bed storage area 7 may be an integral part of a vehicle or may be separate unit towed by the vehicle.

The stacks 9 are arranged in longitudinal rows extending from the rear end to the front end of the flat bed storage area 7. The stacks 9 in each row are located on a conveyor for moving the stacks as described later.

In this embodiment there are three rows with eight stacks 9 in each row and twenty five cones 3 in each stack 9 giving a total of six hundred (600) cones 3 for use. The number of rows and the number of stacks 9 in each row and the number of cones 3 in each stack 9 may be varied according to requirements.

The apparatus 1 includes a tower 11 mounted on guide rails 13 secured at the rear end of the flat bed storage area 7 by one or more brackets 15. The guide rails 13 extend horizontally across the back of the flat bed storage area 7 transverse to the direction of movement of a vehicle provided with the flat bed storage area 7. The tower 11 is mounted on the guide rails 13 for sliding movement transverse to the direction of movement of the vehicle. The tower 11 may also be movable up and down between a lowered, working position close to the road 5 for dispensing/retrieving cones 3 and a raised position when not dispensing/retrieving cones so as to be a safe height above the road 5 for travelling.

A motor (not shown) such as a stepper motor may be provided to power traversing movement of the tower 11 relative to the guide rails 13. The motor may be controlled from a control unit (not shown) for accurately positioning the tower 11. Any suitable control unit may be employed including, but not limited to, electronic devices such as computers, laptops, palmtops and similar devices.

The control unit may be operated via a user interface from the driver's cab. Alternatively or additionally, the control unit may be operated via a user interface on the tower 11. Alternatively or additionally, the control unit may be operated via a hand held user interface such as a remote controller. The control unit may communicate with the motor via a wireless link to control movement of the tower 11. The control unit may include a memory, for example for storing factory settings. The control unit may be programmable allowing the user to select and/or change operation of the apparatus.

The guide rails 13 include a centre section 13a and end sections 13b, 13c. The centre section 13a has a width approximately equal to the width of the flat bed storage area 7. The end sections 13b, 13c are connected to the centre section by hinges for pivotal movement between a stowed position along the side of the flat bed storage area 7 substantially at right angles to the centre section 13a and a deployed position extending parallel to the centre section 13a. End section 13b is shown in the stowed position and end section 13c is shown in the deployed position in FIG. 4.

Figure 2:
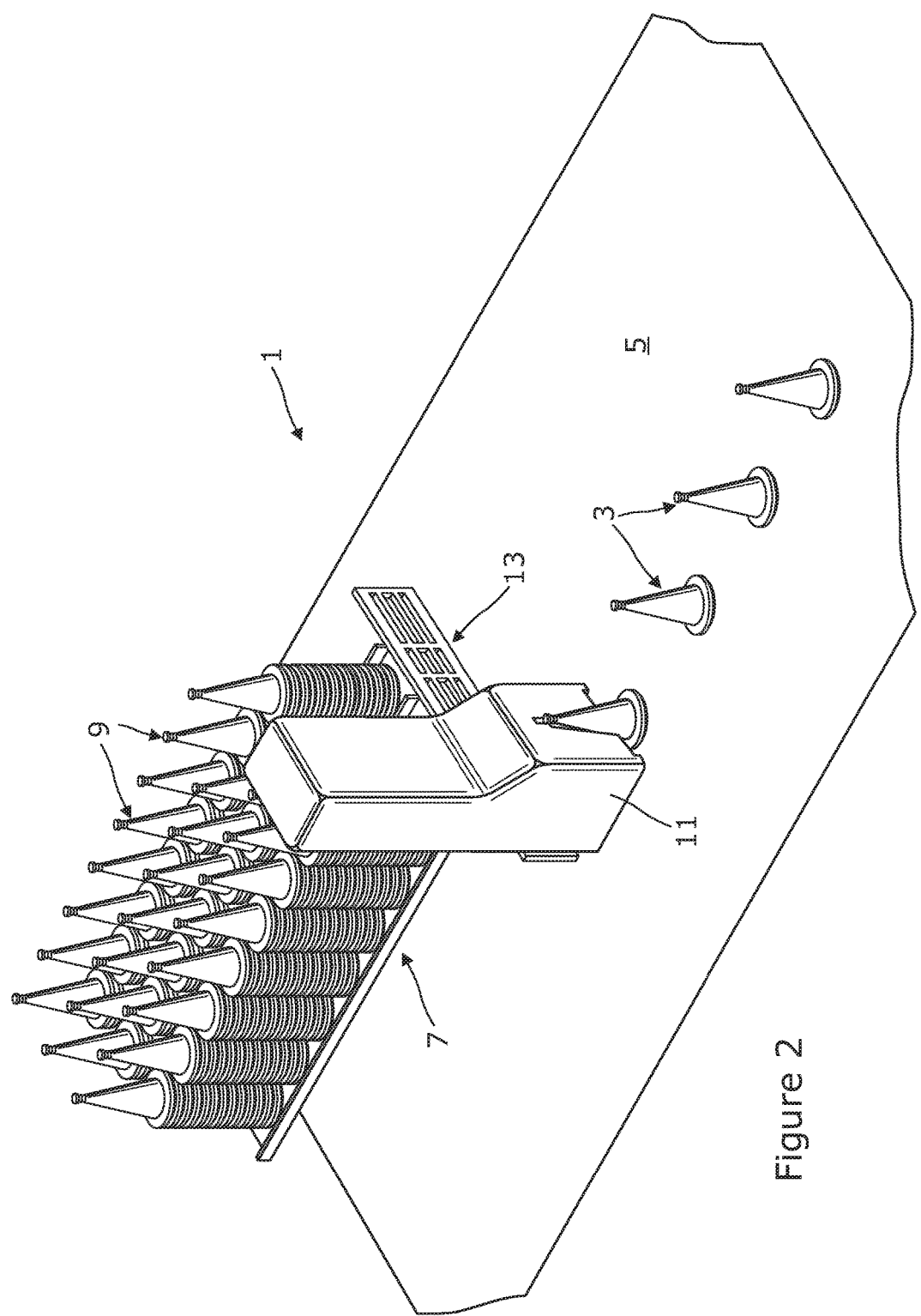
FIG. 2 is a diagrammatic perspective view of the apparatus of FIG. 1 with the tower in an end position.
Figure 3:
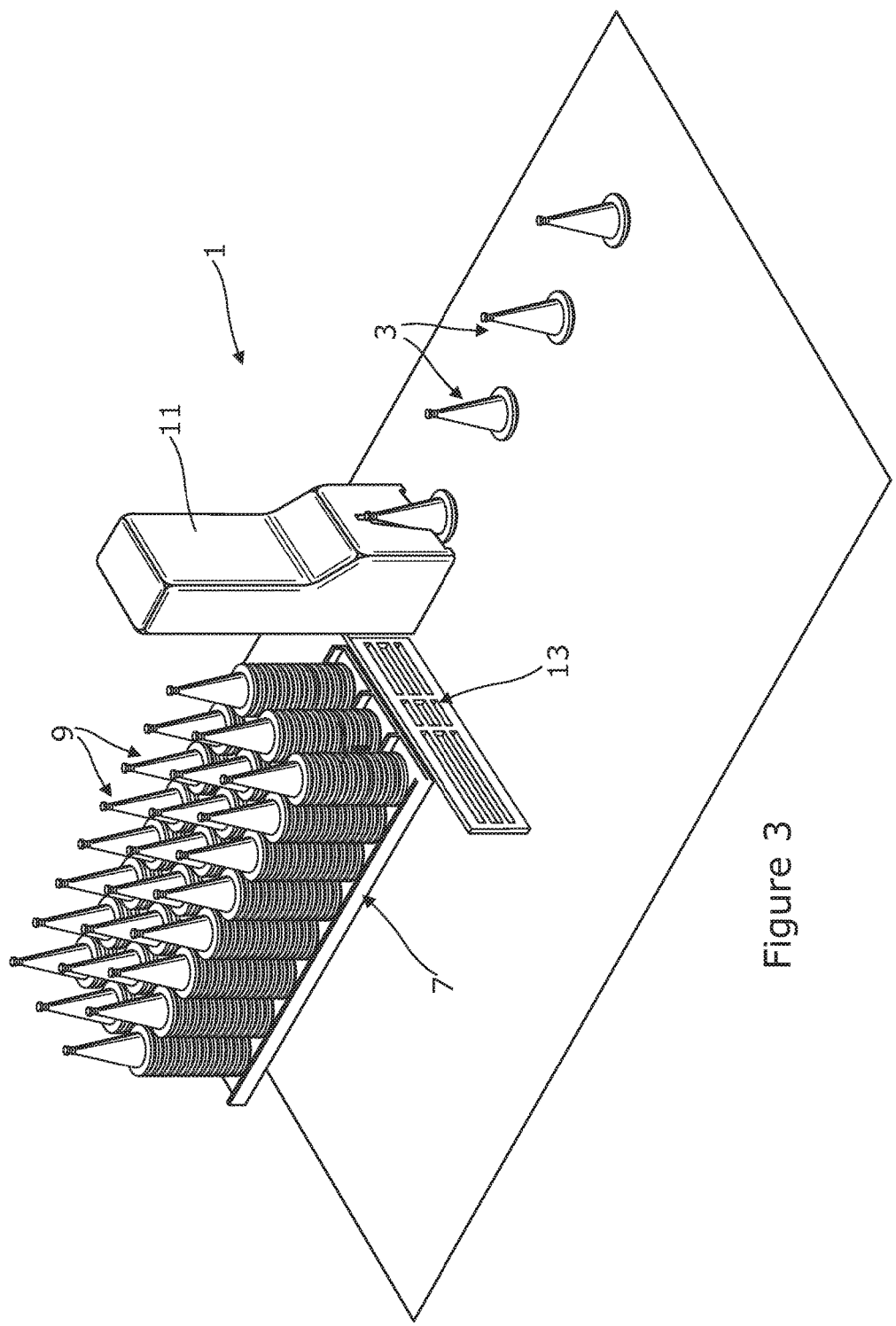
FIG. 3 is a diagrammatic perspective view of the apparatus of FIG. 1 with the tower in another end position.
Figure 4:
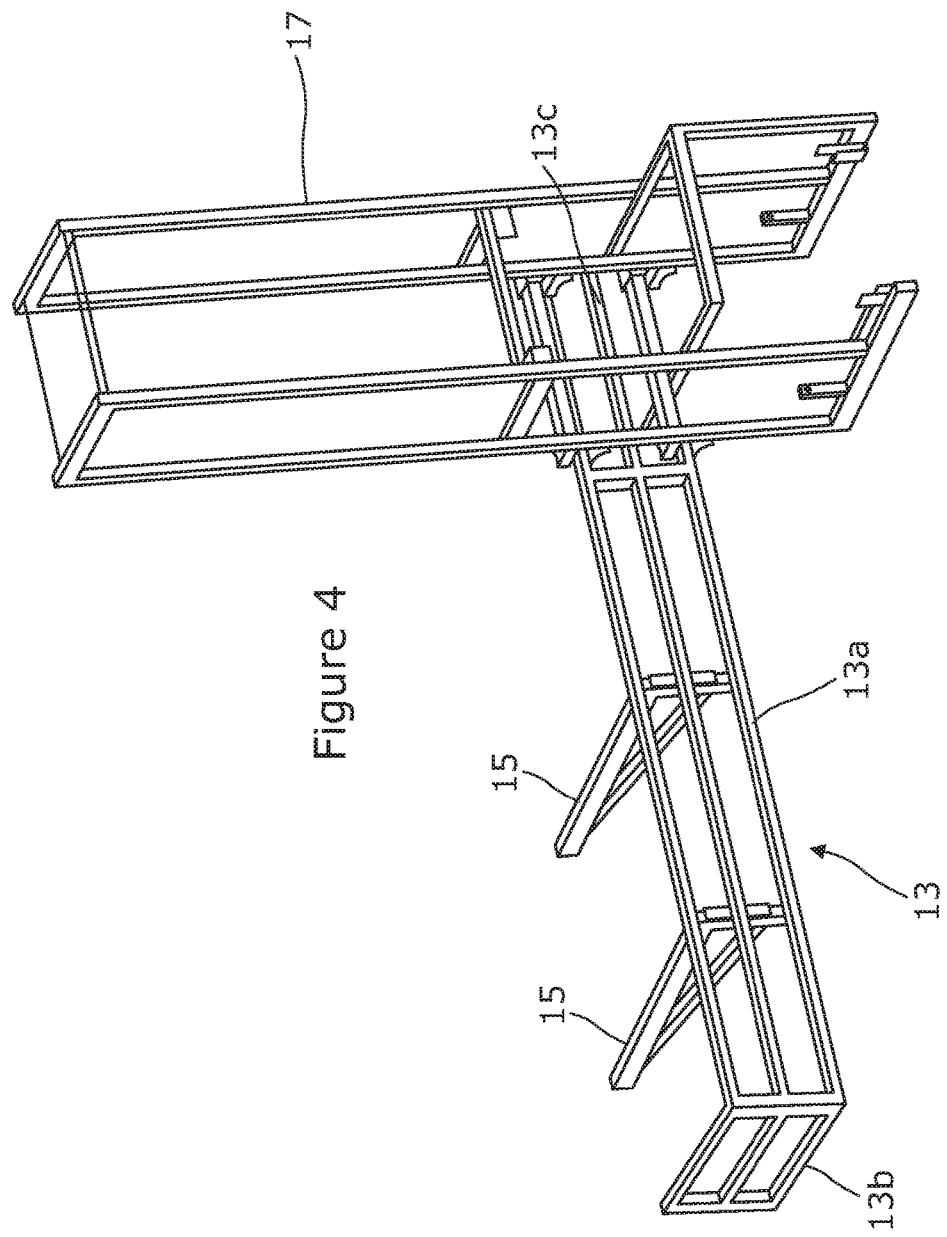
FIG. 4 is a perspective view of the guide rails and tower frame.
Figure 5:
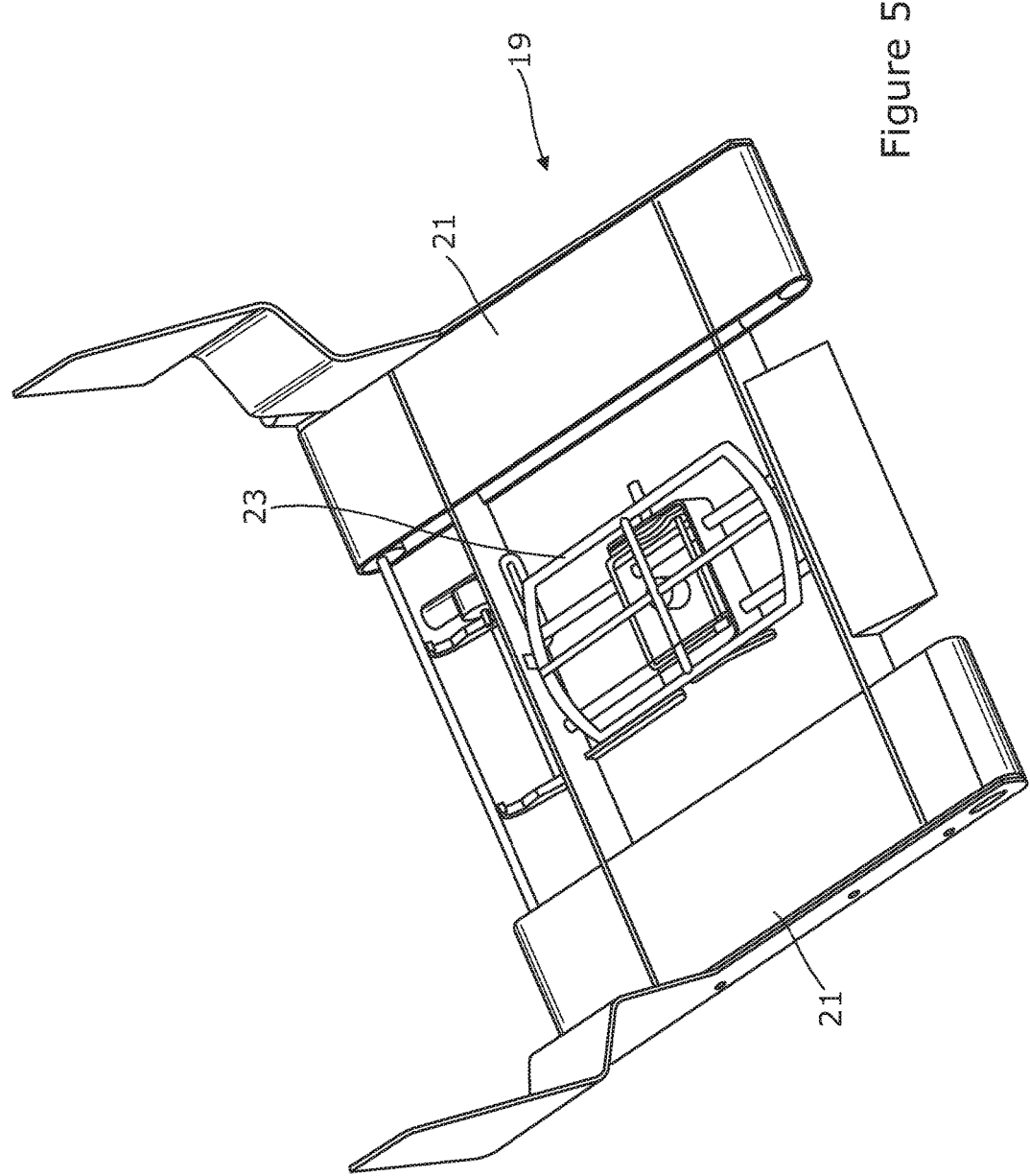
FIG. 5 is a perspective view of the tower platform.

In the deployed position, the end sections 13b, 13c increase the width of the guide rails 13 to extend beyond the sides of the flat bed storage area 7 and allow movement of the tower 11 transverse to the direction of movement of the vehicle from a mid-position shown in FIG. 1 to the end positions shown in FIGS. 2 and 3. In the end positions the tower 11 is located outboard of the flat bed storage area 7. The tower 11 can be moved between the end positions for dispensing and retrieving cones 3 with the tower 11 located in either end position or any intervening position between the end positions.

Successive cones 3 may be set down at the same position to form a line following the direction of the vehicle by maintaining the tower 11 at the same position while dispensing cones 3. Alternatively, successive cones 3 may be set down at positions offset from one another across the width of the guide rails 13 to form a line that tapers from one side of the vehicle to the other by moving the tower 11 from one end position to the other end position while dispensing cones 3. Such tapered line may be provided at the start and end of a section of road along which the cones 3 are to be deployed.

The tower 11 has a frame 17 (FIG. 4) mounted on the guide rails 13 and a platform 19 (FIGS. 5 to 8) movable vertically within the tower frame 17 to and from a lower transfer position for dispensing cones 3 onto the road 5 and for retrieving cones 3 from the road 5.

To dispense cones 3, the platform 19 is raised to an upper transfer position spaced above, preferably directly above, the lower transfer position. The tower 11 is positioned to align the platform 19 with the conveyor of a row of stacked cones 3 on the flat bed storage area 7. The conveyor of the aligned row of stacked cones 3 is operated to move the stacks 9 towards the tower 11 and to insert the first stack 9 of cones 3 onto the platform 19. In a modification described in more detail later with reference to FIG. 19, the apparatus includes a device for transferring a stack of cones between the conveyor and the tower.

The platform 19 has a pair of powered belts 21 either side of a central elevator 23. The belts 21 assist movement of the stack 9 of cones 3 onto the platform 19 within the tower 11. The elevator 23 can be raised relative to the powered belts 21 to engage the bottom cone 3 in the stack 9 located on the platform 19 to centre the stack 9 of cones 3 on the platform 19. The elevator 23 can also be raised to lift the stack 9 of cones 3 above the powered belts 21 for a purpose described below.

The tower 11 is provided with a plurality of sets of gripping fingers 25 (FIGS. 6 to 9) for holding cones 3 in the stack 9 in an elevated position when the platform 19 is returned to the lower transfer position. The gripping fingers 25 are moveable in unison between open and closed positions. The gripping fingers 25 are moveable from the open position when inserting the stack 9 of cones 3 onto the platform 19 to the closed position to locate under the base 3a of a cone 3 in the stack 9.

The stack 9 of cones 3 is lifted a small distance by the platform, for example 5 mm, to provide clearance for the gripping fingers 25 to move from the open position to the closed position to locate under the base 3a of a cone 3 in the stack. If necessary the elevator 23 is operable to rotate the stack 9 of cones 3 to orientate the bases 3a for engagement with the gripping fingers 25.

The stack 9 of cones 3 is positioned so that, when the gripping fingers 25 move from the open position to the closed position and the stack 9 of cones 3 is lowered, the cone 3 at the bottom of the stack 9 is not supported by the gripping fingers 25.

As a result, the cone 3 at the bottom of the stack 9 is released from the stack 9 and, supported on the platform 19, moves with the platform 19 from the upper transfer position to the lower transfer position, while the remaining cones 3 in the stack 9 are retained in the elevated position at the upper end of the tower 11 by the gripping fingers 25 located under the base 3a of the cones 3.

In the lower transfer position, the powered belts 21 on the sides of the platform 19 are operable to move the cone 3 rearwards from the platform 19 and dispense the cone 3 onto the road.

The platform 19 is then raised to engage the bottom cone 3 of the stack 9 of cones 3 held in the elevated position within the tower 11 by the gripping fingers 25. The stack 9 of cones 3 is then lifted a small distance to allow the gripping fingers 21 holding the cones 3 in the stack 9 to open. The platform 19 is then lowered a distance equal to one cone base so that, when the gripping fingers 25 are moved to the closed position, the cone 3 at the bottom of the stack 9 is not supported by the gripping fingers 25.

As a result, the cone 3 at the bottom of the stack 9 is released from the stack 9 and, supported on the platform 19, moves with the platform 19 from the upper transfer position to the lower transfer position for dispense onto the road as described above while the remaining cones in the stack 9 are held in the elevated position within the tower 11 by the gripping fingers 25. One or more actuators (not shown) may be provided at the base of the stack in the tower that are operable to engage with the cone to be released and force it out of the stack. The above operation is then repeated until all the cones 3 in the stack 9 have been dispensed.

In a modification of the above operation, the platform 19 and gripping fingers 25 can be controlled so that two or more cones 3 can be released from the stack 9 at the same time and dispensed onto the road stacked on top of each other. This may be desirable, for example in windy conditions, to provide additional weight and stability so that the cones 3 stay in position on the road.

When all the cones 3 in the stack 9 have been dispensed, the tower 11 is positioned to receive another stack 9 of cones 3 from the flat bed storage area 7 and the above operation repeated until all the stacks of cones 3 in the flat bed storage area 7 have been transferred to the tower 11 and dispensed or until sufficient cones 3 have been dispensed to demarcate the required section of the road. In a modification described in more detail later with reference to FIG. 19, the apparatus includes a device for transferring a stack of cones between the conveyor and the tower. In this way, the device can receive the next stack of cones to be dispensed from the storage area and move the stack to align with the tower while the tower is dispensing cones from a previous stack of cones. In this way, the tower may not have to be moved to receive the next stack of cones from the storage area so that dispense of cones may continue without interruption.

Where the cones 3 are stacked in rows, transfer of the stacks 9 from the flat bed storage area 7 to the tower 11 may be controlled by the control unit to maintain a balanced load. For example, the tower 11 may receive a stack 9 of cones 3 from each row in turn or any other sequence to maintain a balanced load in the storage area.

To retrieve the cones 3, the vehicle is driven in reverse. Cameras may be provided at the rear of the vehicle and in the driver's cab to assist the driver to position the tower 11 in line with the cones 3 on the road.

Sensors on the tower 11 and/or cone 3 may provide fine adjustment for accurately positioning the tower 11. Any suitable sensors may be employed. Preferably the sensors are capable of operating under all conditions including at night when the volume of traffic using the road is often lower than in the day and it is more convenient to retrieve cones from the road.

Figure 6:
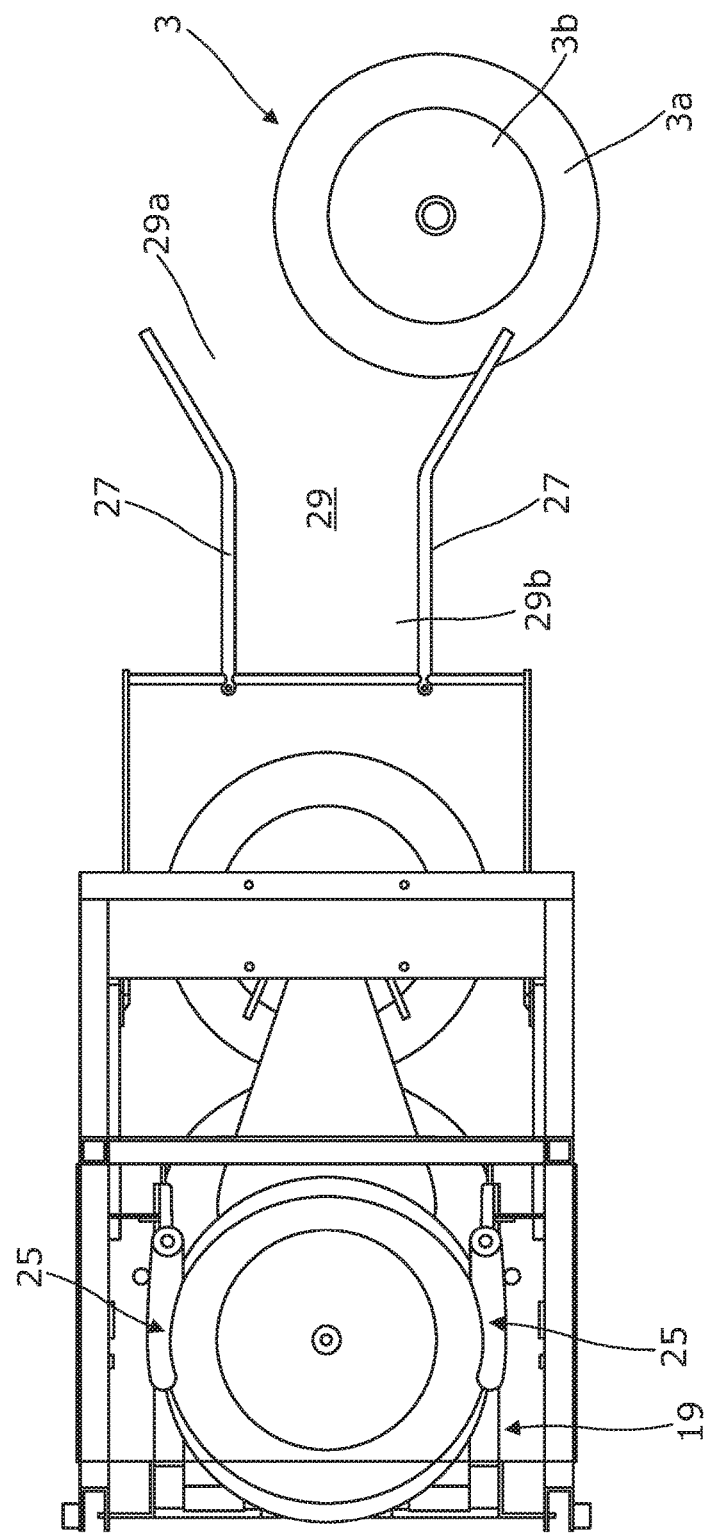
FIGS. 6 to 9 show the apparatus retrieving a cone from a surface.

The tower 11 may be provided with guide bars 27 that are deployed as the tower 11 approaches the cone 3 to be retrieved. The guide bars 27 define a channel 29 to receive and guide the platform 19 towards the cone 3. The outer ends of the guide bars 27 are angled outwards to provide the channel 29 with a tapered section 29a leading to a narrower parallel section 29b to align the platform 19 with the cone (FIG. 6).

The guide bars 27 are pivotal about a vertical axis at the inner ends such that, if the cone 3 is offset to one side of the parallel section 29b, the cone 3 contacts the angled outer end of the guide bar 27 on that side causing the guide bar 27 to pivot outwards about the inner end against the biasing of a return spring or other restoring force.

This pivotal movement actuates a switch (not shown) that moves the tower 11 to correct the offset until the guide bar 27 no longer presses against the cone 3 and the tower 11 stops leaving the cone 3 aligned with the parallel section 29b central to the platform 19.

In a modification (not shown), one or more sensors may be provided on the tower and/or the cones for detecting the position of a cone and moving the tower to align the platform with the cone. The sensors may be used in place of as well as the guide bars 27. The sensors may be of any suitable type, for example infra-red sensors or laser sensors.

Figure 7:
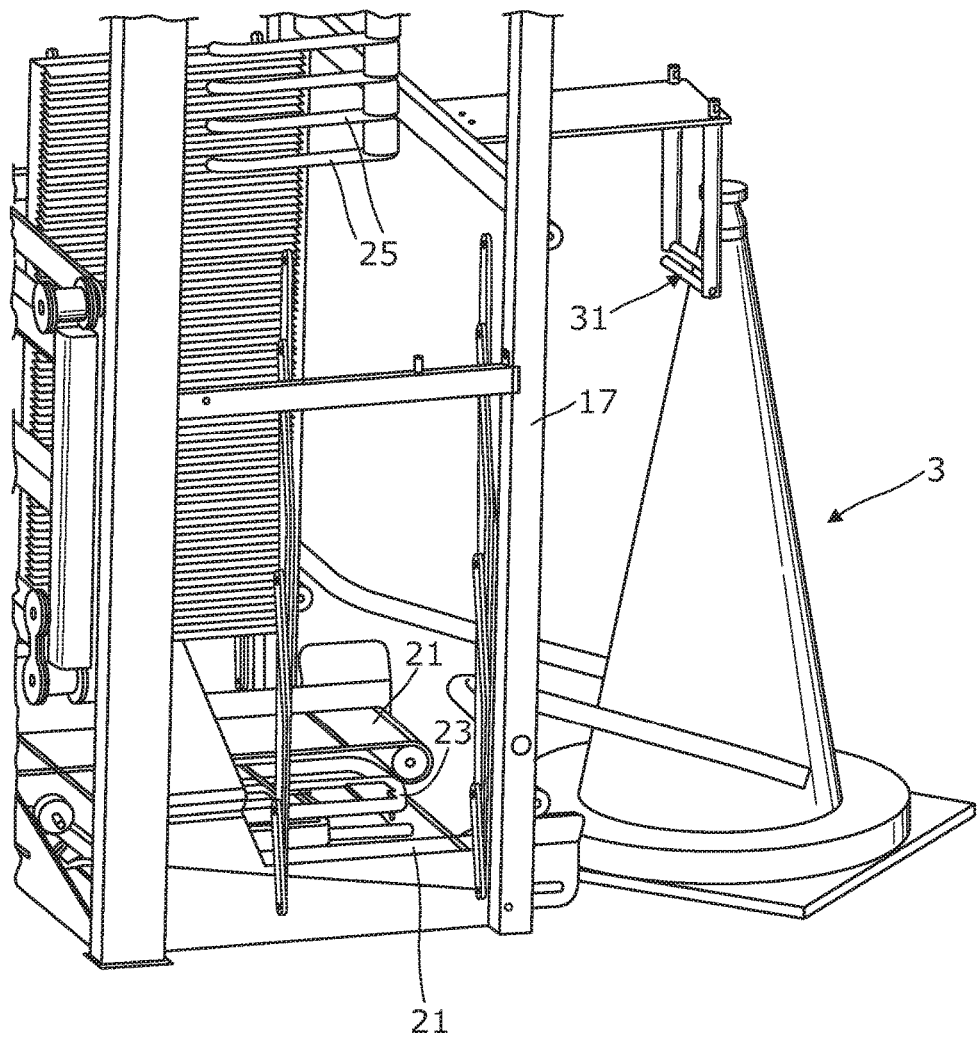
Figure 8:
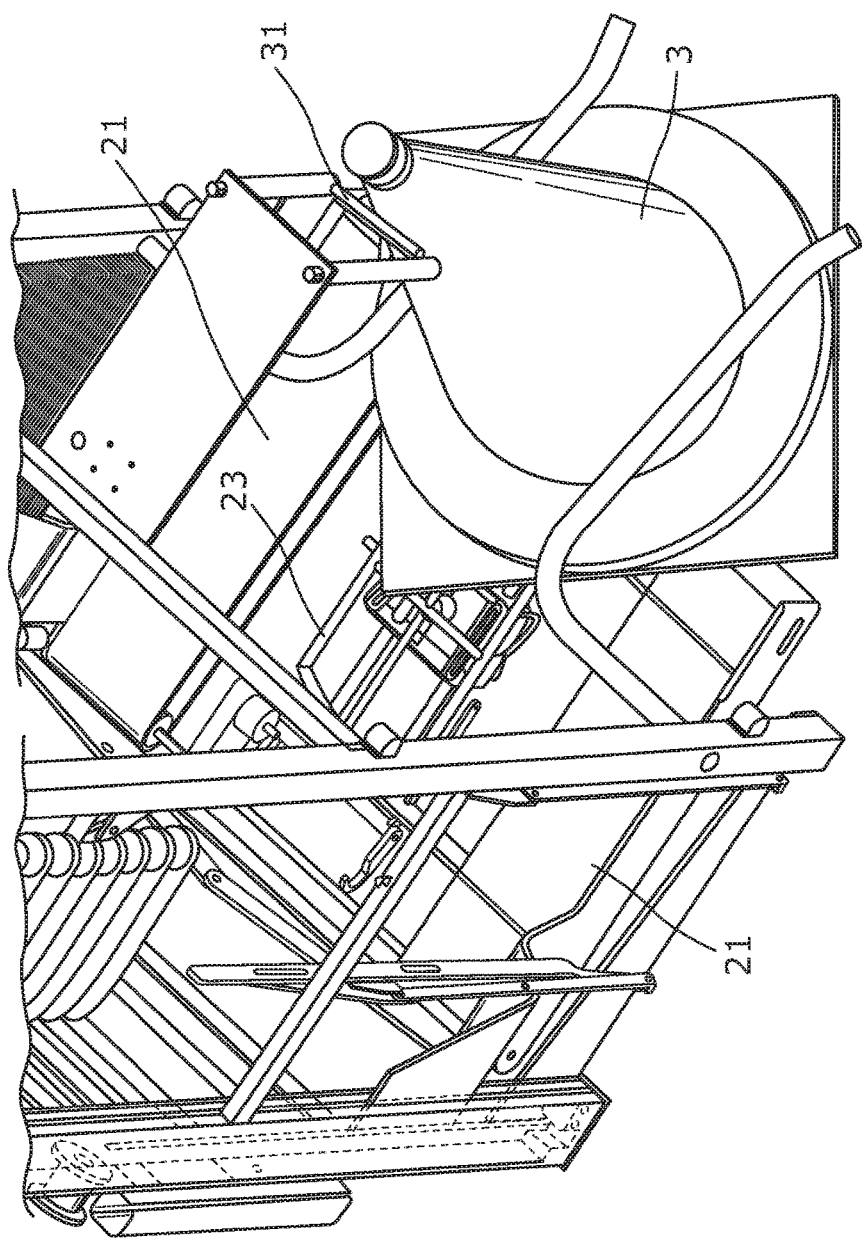

As the platform 19 approaches the cone 3, tilt bars 31 engage the upper end of the cone 3 (FIG. 7 causing the cone 3 to tilt about the base 3a so that the edge of the base 3a nearest to the platform 19 is raised (FIG. 8). Two tilt bars 31 are employed in this embodiment but this is not essential and it may be that one tilt bar may be employed. The or each tilt bar 31 may be provided with a feature which contacts the cone and prevents the cone from twisting or toppling to one side if it is titled onto a corner of the base. For example the or each tilt bar may be provided with a formation co-operable with the cone to locate the cone in a desired orientation for retrieval onto the platform.

Figure 9:
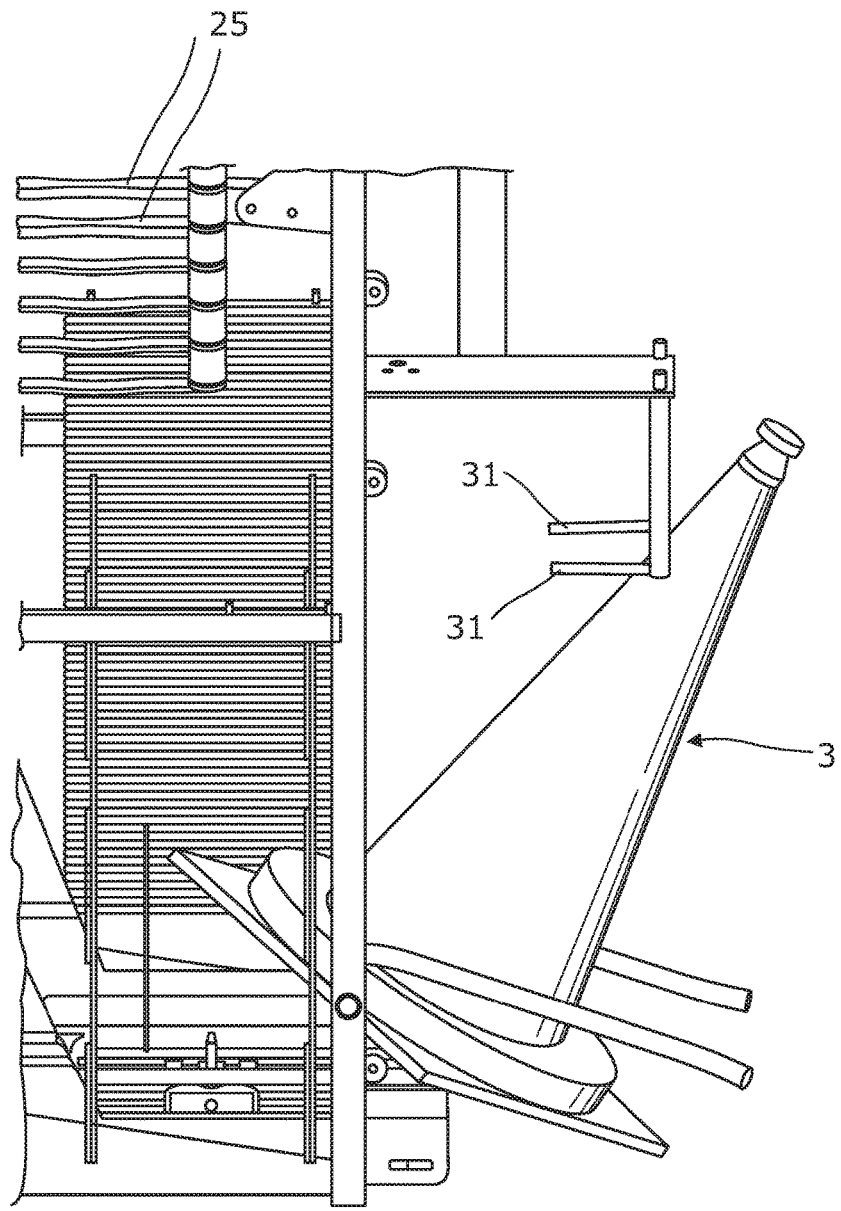

The cone 3 is tilted to an angle relative to the road so that the powered belts 21 at the side of the platform 19 can access beyond the centre of the base 3a of the cone 3 to retrieve the cone 3 and the tilt bars 27 gradually open guiding the cone 3 onto the platform 19 (FIG. 9).

The tilt angle may be approximately 35 degrees although this may change according to the shape and size of the base 3a of the cone 3. As the cone 3 is retrieved, anti-skid bars 33 (FIGS. 10, 11, 12) are deployed to prevent the cone 3 skidding on the road. Two anti-skid bars 33 are employed in this embodiment but this is not essential and it may be that one anti-skid bar may be employed When the cone 3 has been retrieved from the road onto the platform 19, the elevator 23 may be operable to position the cone 3 centrally on the platform 19 with respect to the gripping fingers 25. For example, the elevator 23 may engage the hole in the base 3a of the cone. The hole and/or part of the elevator 23 received in the hole may taper in towards the top of the base 3a. Tapering the hole in the base of the cone 3 and the part of the elevator 23 received in the hole may better secure the cone 3 to the elevator 23. The elevator 23 may also rotate the cone 3 to orientate the base 3a for engagement with the gripping fingers 25.

The platform 19 is then raised to lift the cone 3 with the gripping fingers 25 closed to position the base 3a of the retrieved cone 3 below the bottom set of gripping fingers 25. The gripping fingers 25 are opened and the cone 3 lifted to position the base 3a of the retrieved cone 3 above the bottom set of gripping fingers 25.

As a result, when the gripping fingers 25 are closed, the retrieved cone 3 is supported on and held in the elevated position by the bottom set of gripping fingers 25 when the platform 19 is lowered to receive the next cone 3 retrieved from the road, If one or more cones are already supported by the gripping fingers 25 when the platform 19 is raised, the body 3b of the retrieved cone 3 on the platform 19 is received within the body 3b of the cone 3 supported by the bottom set of gripping fingers 25. When the gripping fingers 25 are opened, the stack of cones 3 is lifted one cone base to position the base 3a of the retrieved cone 3 above the bottom set of gripping fingers 25.

As a result, when the gripping fingers 25 are closed, the stack of cones including the retrieved cone 3 is supported on and held in the elevated position by the gripping fingers 25 when the platform 19 is lowered to receive the next cone 3 retrieved from the road. This operation is repeated to reform a stack 9 of cones 3 within the tower 11.

When the last cone 3 to re-form a complete stack 9 of cones 3 is raised on the platform 19, the tower 11 is moved to align with a conveyor on the flat bed storage area 7. The gripping fingers 25 are moved to the open position so that the complete stack 9 of cones 3 is supported on the platform 19. The stack 9 of cones 3 is transferred from the platform 19 to the conveyor with the platform 19 in the upper transfer position level with the conveyor by means of the powered belts 21. In a modification described in more detail later with reference to FIG. 19, the apparatus includes a device for transferring a stack of cones between the conveyor and the tower. In this way, the device can move the stack of cones to be returned to the storage area to align with the conveyor on the storage area while the tower is picking up cones to form the next stack of cones. In this way, the tower may not have to be moved to return the stack of cones to the storage area so that retrieval of cones may continue without interruption.

The conveyor then moves the stack 9 of cones 3 towards the front of the flat bed storage area 7 a distance sufficient to allow another stack 9 of cones 3 to be returned from the tower 11 to re-form the row of stacked cones 3. The return of stacks of cones from the tower 11 to the flat bed storage area 7 may be controlled by the control unit to maintain a balanced load. For example, the stacks 9 of cones 3 may be returned to the rows in turn or any other sequence to maintain a balanced load in the storage area. This operation is repeated until all the cones 3 are recovered.

As will be understood, the above operation to dispense and retrieve the cones 3 is fully automated, does not require any manual lifting of the cones 3 and can be carried out by the driver of the vehicle without any additional operators. It will be appreciated however, that the tower 11 may be employed without the conveyors on the flat bed storage area 7 and that the stacks 9 of cones 3 on the flat bed storage area 7 may be manually inserted into the tower 11 and retrieved from the tower 11.

Figure 10:
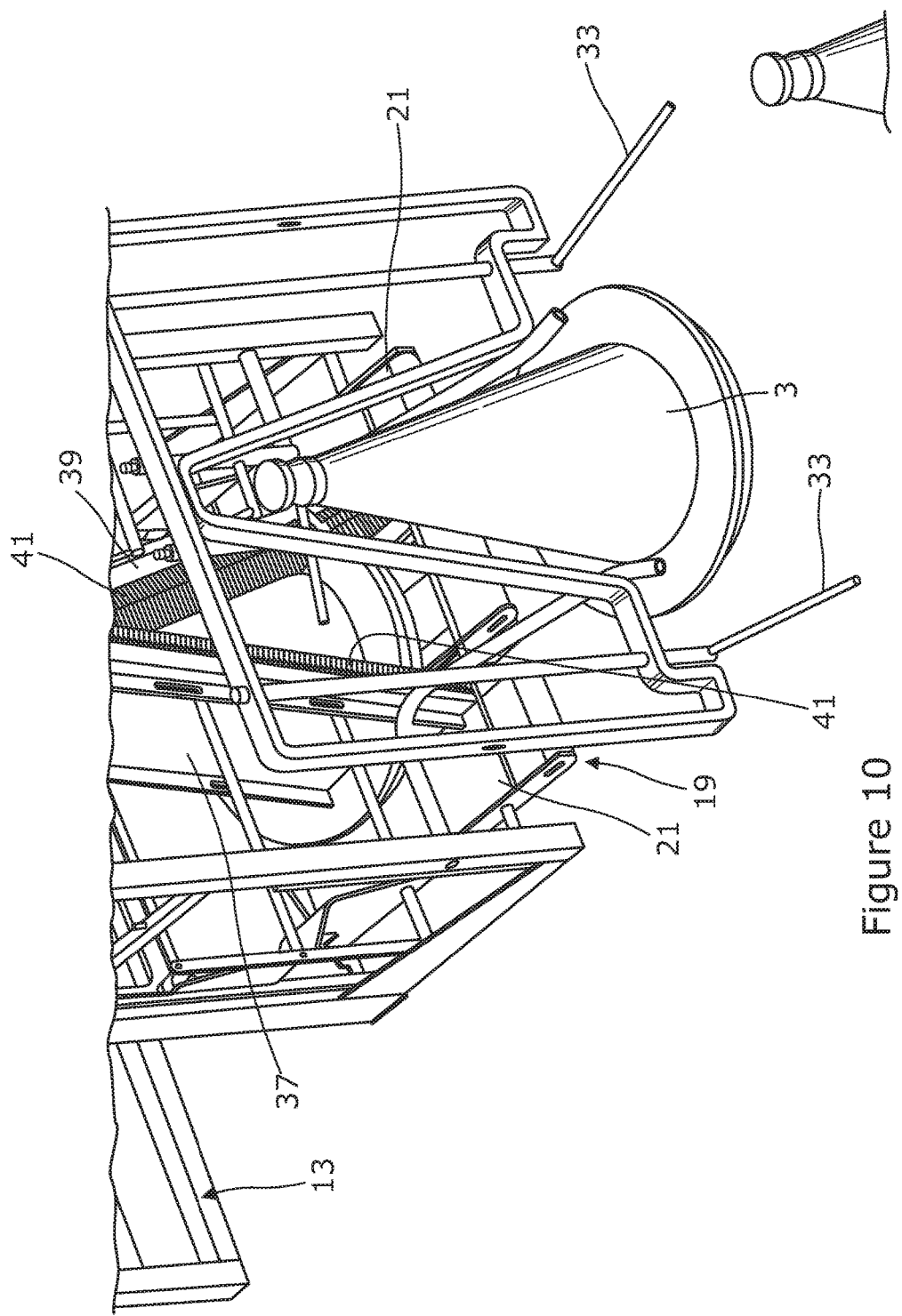
FIGS. 10 to 12 show the cone washing device.
Figure 11:
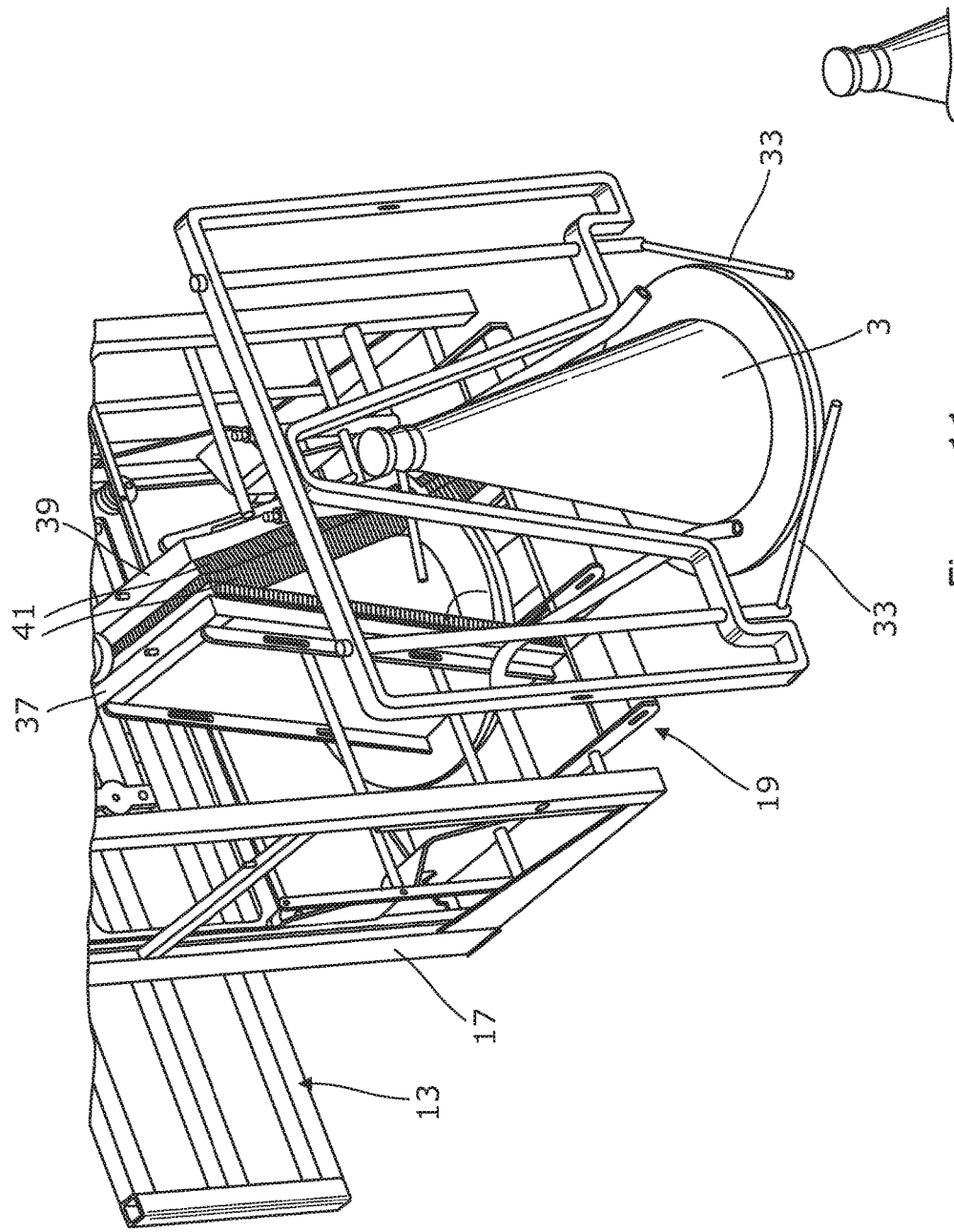
Figure 12:
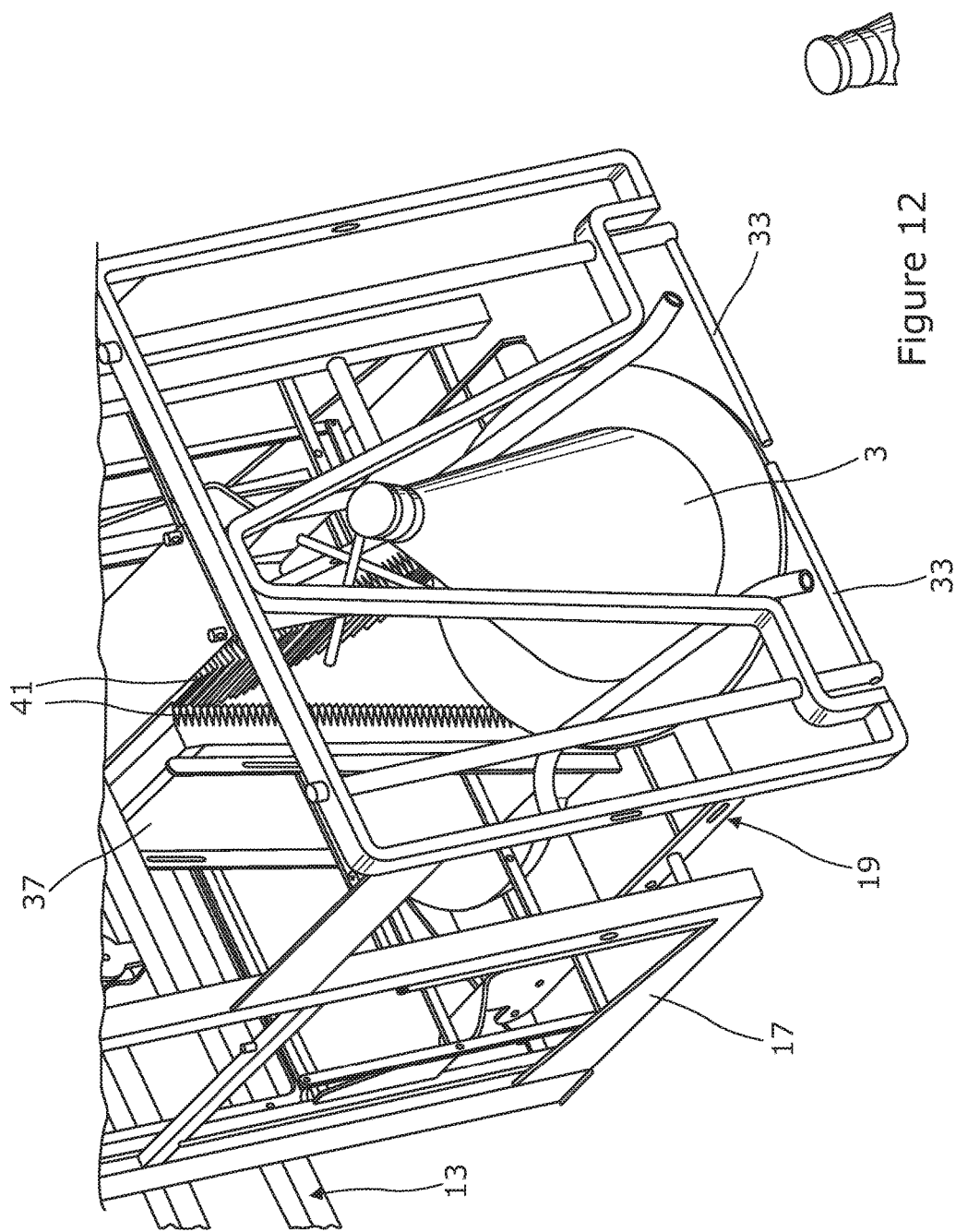

Referring now to FIGS. 10, 11 and 12, a cone washing device 35 is shown for washing a cone 3 when the cone 3 has been retrieved from the road. Alternatively, or additionally the cone 3 could be washed before it is dispensed onto the road.

The cone washing device 35 includes a pair of panels 37, 39 that are movable to a cleaning position in which the panels 37, 39 close onto a cone 3 located on the platform 19 in the lower transfer position. The elevator 23 is operable to lift and rotate the cone 3 relative to the panels 37, 39. Although two panels are employed in this embodiment, fewer than two panels, i.e. one panel, or more than two panels may be employed.

The surface of the panels 37, 39 contacting the cone 3 is configured, for example with bristles 41 or the like, for cleaning the outer surface of the cone 3 with clean water delivered to one or both panels 37, 39 from a clean water tank (not shown) on the vehicle.

The dirty water from washing the cone 3 may be collected by a drain system placed under the platform 19 and returned to a grey water tank (not shown) on the vehicle. The collected grey water may be filtered and recycled to the clean water tank for use in washing the retrieved cones.

The tower 11 may include a heater unit (not shown) to dry the cones 3 after washing. For example the heater unit may be arranged to dry the cones 3 as they are moved by the platform 19 between the lower transfer position and the upper transfer position. The heater unit may be of any suitable type and may use warm air to dry the cones 3. The heater unit may also be used to warm or dry cones 3 affected by frost or other cold/wet weather conditions.

Figure 13:
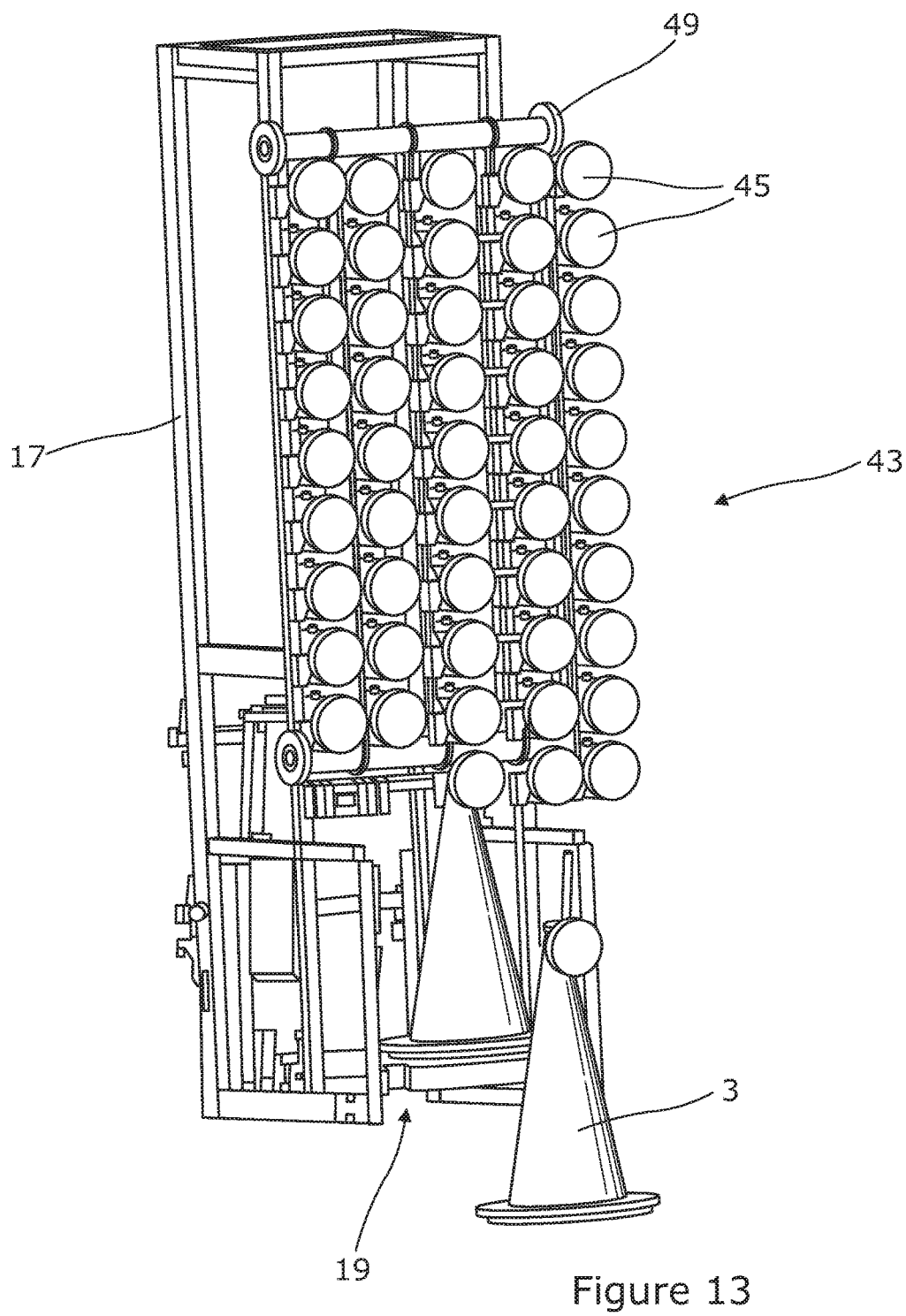
FIGS. 13 and 14 show the lamp transfer device.
Figure 14:
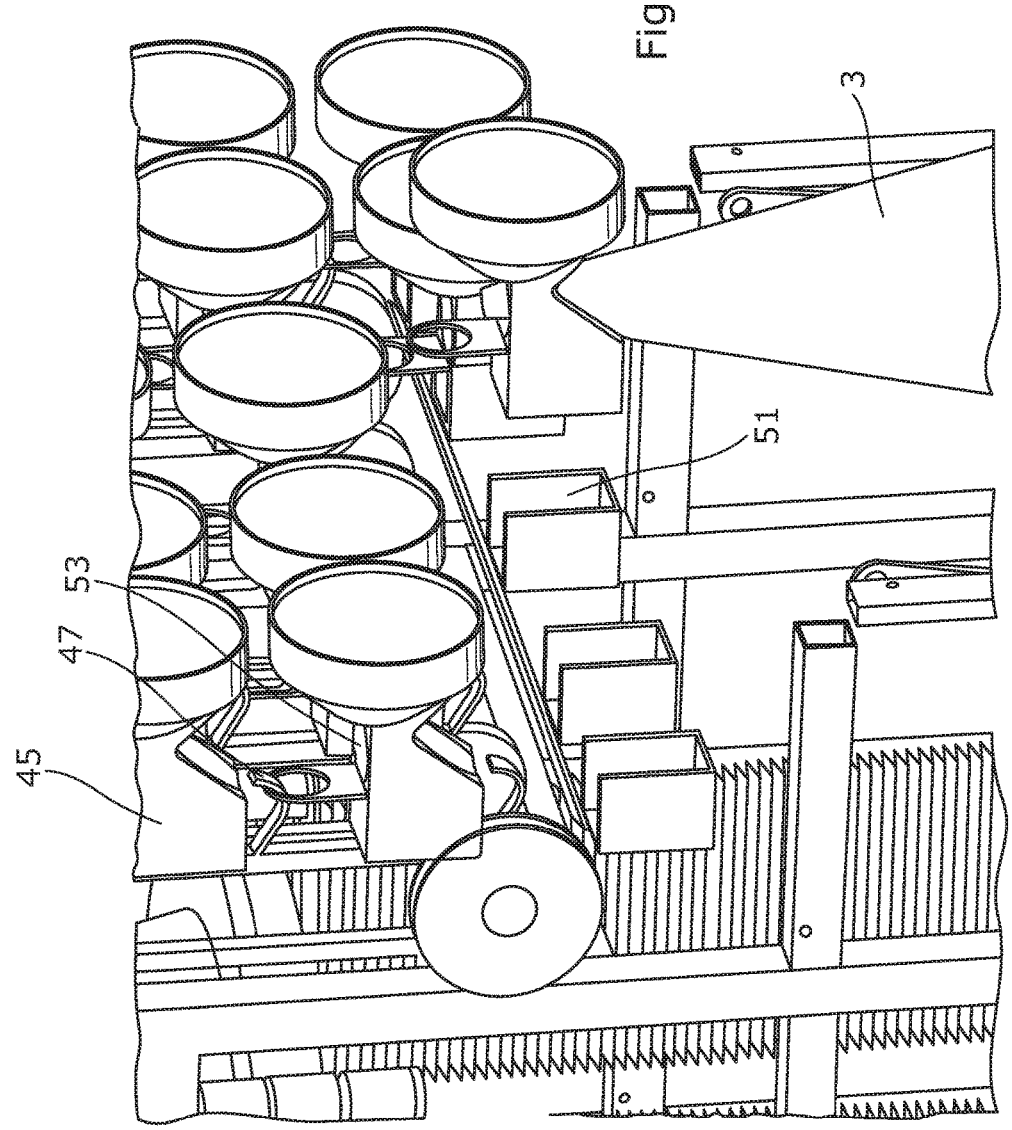

Referring now to FIGS. 13 and 14, a lamp transfer device 43 is shown for fitting a lamp unit 45 to the top of a cone 3 prior to the cone 3 being dispensed onto the road and for removing the lamp unit 45 from the cone 3 when the cone 3 is retrieved from the road.

The lamp units 45 may be battery powered. For example the lamp units 45 may be provided with one or more batteries. The or each battery may be rechargeable. The lamp units 45 may include any suitable light source, for example one or more light emitting diodes (LEDs). The light source may provide white light or coloured light.

The lamp units 45 may have one or more sensors operable to switch the lamp units 45 on and off according to the ambient light levels. Alternatively, the lamp units 45 may be operated on a timer device that may be activated when the lamp unit 45 is fitted to a cone 3 and deactivated when the lamp unit 45 is removed from the cone 3. Any other means for switching the lamp units on and off may be employed.

The light units 45 may be configured for continuous or intermittent illumination. For example the light units 45 may be set to flash on and off. The light units 45 may be set to flash on and off with a fixed or variable time interval. The light units 45 may be set for sequential flashing.

The lamp transfer device 43 is mounted on the front of the frame 17 of the tower 11 and includes a plurality of lamp units 45 mounted on hooks 47 fixed in rows to a powered rotating belt/chain 49 to raise and lower the rows of lamp units 45 according to the direction in which the belt/chain 49 is rotated.

When fitting the lamp units 45 to cones 3 being dispensed onto the road, the rows of lamp units 45 rotate down one row and one of the lamp units 45 in the bottom row drops into a holder 51 positioned to receive the lamp unit 45 and the lamp unit 45 is released from the hook 47.

In this embodiment the holder 51 is a box open at the front in which the lamp unit 45 is located and retained in place. The holder 51 is movable from side to side to position the lamp unit 45 in a central position with respect to the platform 19.

When a cone 3 arrives at the lower transfer position on the platform 19, it is moved to align the top of the cone 3 with a hole 53 in the lamp unit 45 at the central position and the elevator 23 raises the cone 3 to insert the top of the cone 3 into the hole 53 (FIG. 14) and attach the lamp unit 45 to the cone 3.

As a result, when the cone 3 is moved forwards by the platform 19, the lamp unit 45 moves out of the holder 51 and the cone 3 with the lamp unit 45 attached is dispensed onto the road.

The rows of lamp units 45 rotate up one row and the holder 51 is positioned below a lamp unit 45 in the bottom row and the rows of lamp units 45 are rotated down one row to transfer the lamp unit 45 to the holder 51. The holder 51 then positions the lamp unit 45 in the central position for transfer to another cone 3.

This operation is repeated until all the lamp units in one row have been transferred to cones 3 and the rows of lamp units 45 are rotated to lower the next row for transfer to the cones 3. In this embodiment, each row is shown having five lamp units 45 but it will be understood that there may be more than or less than five lamp units 45 in each row.

Lamp units 45 may be attached to each cone 3 to be dispensed onto the road. Alternatively, lamp units 45 may be attached to only some of the cones 3 to be dispensed on the road, for example where the number of cones 3 to be dispensed exceeds the available number of lamp units 45, some cones may be dispensed without lamp units 45.

It may be that the platform 19 can be controlled via the control unit to attach a lamp unit 45 to the cone 3 to be dispensed. The control unit may be programmable to operate the platform 19 to attach a lamp unit 45 to every other cone 3 or at some other interval as desired. Alternatively or additionally, the user interface may allow an operator to select the cones 3 to which lamp units 45 are to be attached as the cones 3 are being dispensed.

When a cone 3 having a lamp unit 45 attached is retrieved from the road, the holder 51 is located at the centre position. Sensors identify the orientation of the lamp unit 45 relative to the holder 51 and, if necessary, the elevator 23 rotates the cone 3 to bring the lamp unit 45 into line with the holder 51. The sensors can also be used to rotate the cone/lamp unit to a preset direction when setting it.

The cone 3 with the lamp unit 45 attached is raised by the elevator 23 and may be rotated to position the lamp unit 45 for reception in the holder 51. The cone 3 is then lowered to disengage the top of the cone 3 from the hole 53 in the lamp unit 45 which is held in the holder 51.

The holder 51 is positioned to transfer the lamp unit 45 to a hook 47 and the lamp unit 45 lifted out of the holder 51 when the rows of lamp units 45 rotate up one row. The holder 51 is then moved to receive and transfer another lamp unit 45 from a cone 3 to a hook 47 and the process repeated to recover all the lamp units 45.

The lamp units 45 may be washed when they are recovered and/or when they are dispensed. For example one or more water jets may be arranged to wash a lamp unit 45 received in the holder 51.

Figure 15:
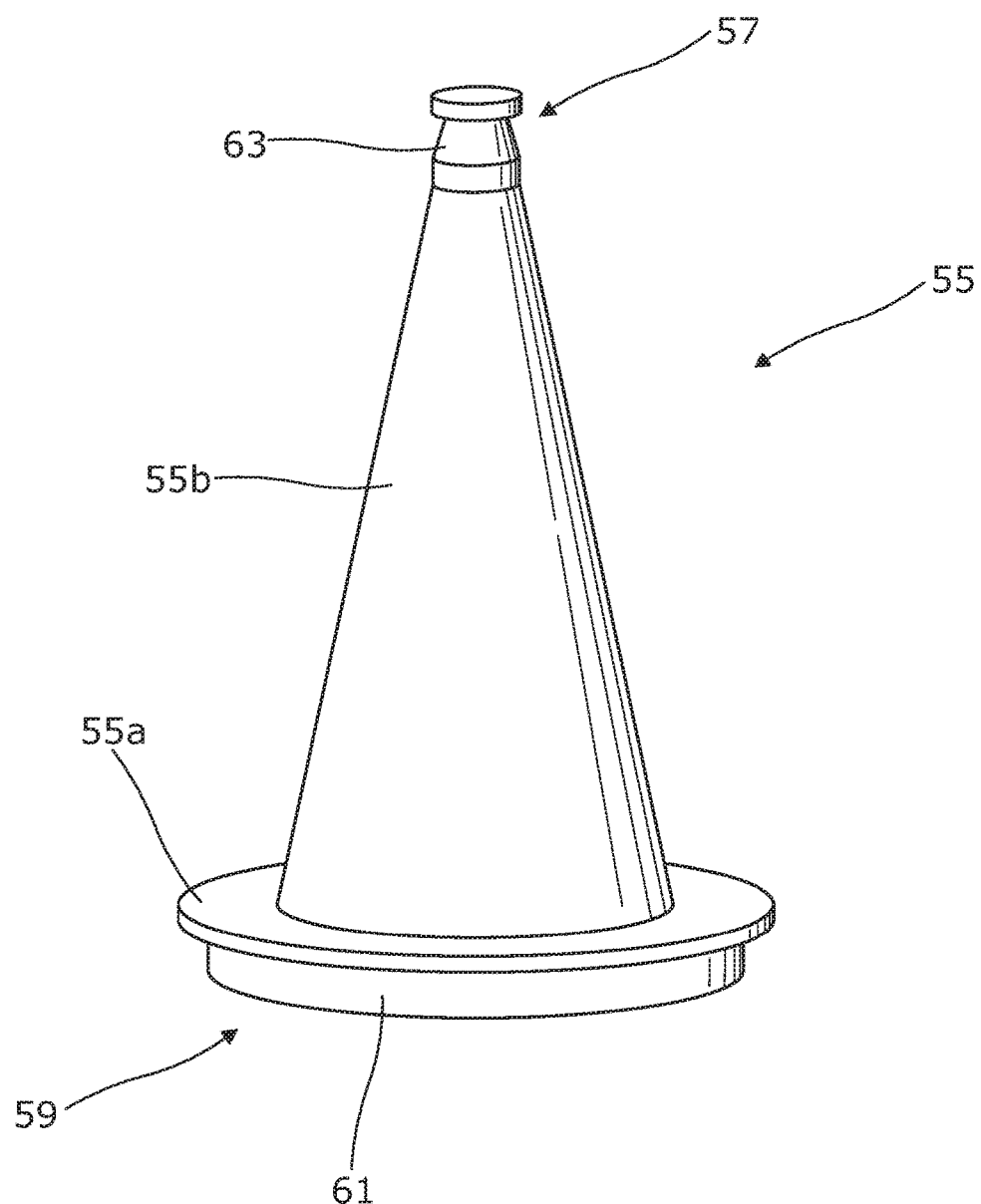
FIG. 15 shows a cone.

Referring now to FIG. 15, a cone 55 suitable for use with the apparatus above-described is shown with a light unit 57.

The cone 55 has a base 55a and a conical-shaped body 55b that is hollow and can be accessed through a central hole in the base 55a. The hole may taper in towards the top of the base. The base 55a may be circular or substantially circular in plan view. In use with the apparatus described above, the elevator 23 of the platform 19 is engageable within the hole to centre and/or rotate the cone 55 on the platform 19 as described previously.

The base 55a is provided on the underside with a spacer formation 59. In this embodiment, the formation 59 is formed by an annular wall 61 inset from the perimeter of the base 55a. The spacer formation 61 may be formed integrally with the base, for example one moulded part. In a modification (not shown), the wall 61 may be replaced by a plurality of spacer formations located at intervals around the underside of the base and inset from the perimeter.

When cones 55 are stacked one on top of another, the spacer formation 59 provides a gap between the bases 55a. In use with the apparatus described above, the gap provides access when the gripping fingers 25 are closed to support the cones 55 in the elevated position within the tower 11 as described previously. The cone 55 may be symmetrical about a vertical axis through the light unit 57. As a result, it may not be necessary to rotate the cone 55 to align the base 55a with the gripping fingers 25. In other embodiments, the cone may be asymmetrical about the vertical axis.

The spacer formation 59 may also reduce the contact points/area between the bases 55a of the cones in the stack. As a result, the effect of frost etc sticking the bases 55a together may be reduced allowing the cones to be separated from the stack as described previously The light unit 57 has a housing 63 at the apex of the body 55b and a light module (not shown) located inside the housing 63. The light module may be detachable from the housing 63 for repair and/or replacement. The housing 63 may be made of a light transmitting material. For example the housing 63 may be made of transparent or translucent plastics.

The housing 63 may be formed integrally with the cone 55, for example one moulded part. Alternatively, the housing 63 may be formed separately from the cone 55 and attached to the cone 55 by any suitable means, for example a push-fit or snap-fit in a hole at the apex of the body 55. Where the housing 63 is attached to the cone 3 it may be detachable for removing the light unit 57 for repair and/or replacement.

The light module may comprise any suitable light source, for example one or more light emitting diodes (LEDs). The light source may provide white light or coloured light. The light module may be battery powered. For example the light unit 57 may be provided with one or more batteries. The or each battery may be rechargeable.

The light units 57 may be configured so as to be interconnected when the cones 55 are stacked one on top of the other such that the batteries of the light units 57 in the stack can be connected to a common power source to re-charge the batteries while the cones 55 are stacked on a vehicle or while in storage. Charging may be effected via a manifold (not shown) attached to one or more stacks of cones 55. The manifold may be attached to the top cone 55 in the or each stack.

The light units 57 may have one or more sensors operable to switch the light units 57 on and off according to the ambient light levels. Alternatively, the light units 57 may be operated on a timer device that may be activated when the cone 3 is dispensed onto the road and deactivated when the cone 3 is retrieved from the road. Any other means for switching the light units 57 on and off may be employed.

The light units 57 may be configured for continuous or intermittent illumination. For example the light units 57 may be set to flash on and off. The light units 57 may be set to flash on and off with a fixed or variable time interval. The light units 57 may be set for sequential flashing.

Figure 16:
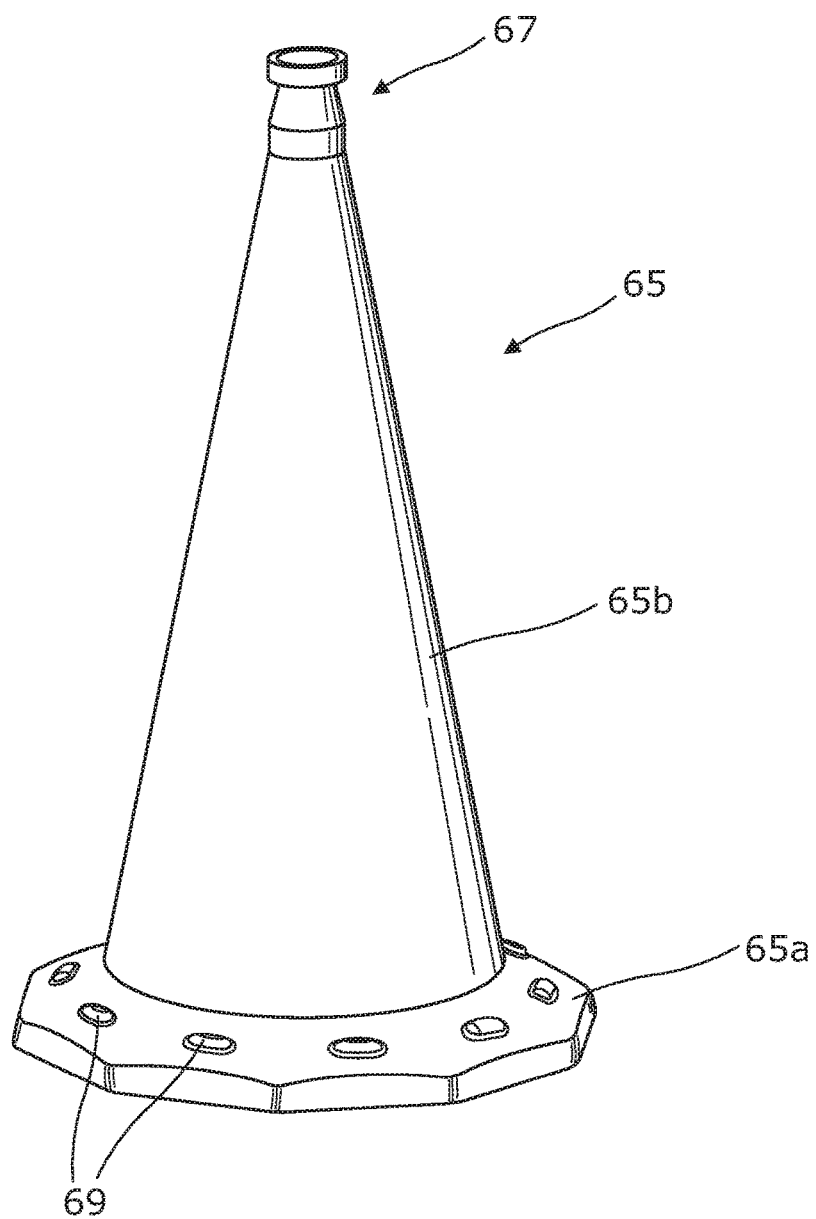
FIG. 16 shows another cone.

Referring now to FIG. 16, another cone 65 suitable for use with the apparatus above-described is shown with a light unit 67 at the apex of the body 65b. The light unit 67 is similar to the light unit 57 of the cone 55 described above with reference to FIG. 15 and the description of the light unit 57 applies to the light unit 67.

The cone 65 has a base 65a and a conical-shaped body 65b that is hollow and can be accessed through a central hole in the base 65a. The hole may taper in towards the top of the base 65a. The base 65a is generally annular in plan view. The upper surface of the base 65a may taper from the body 65b to the outer edge of the base 65a. The draft angle may be 5 to 15 degrees, preferably approximately 11 degrees. The peripheral edge of the base 65a may be circular or polygonal with flats. In use with the apparatus described above, the elevator 23 of the platform 19 is engageable within the hole to centre and/or rotate the cone 65 on the platform 19 as described previously.

The base 65a is provided on the upper surface with a plurality of spacer formations 69 projecting from the upper surface of the base 65a. In this embodiment the spacer formations are provided by a series of ribs located at intervals around the upper surface of the base 65a and inset from the perimeter of the base 65a. The spacer formations 69 may be formed integrally with the cone 65, for example one moulded part.

Any number of spacer formations 69 may be provided. The spacer formations 69 may be of any size or shape and may be provided at any position inset from the perimeter of the base. In a modification (not shown) the spacer formations may be replaced by one formation that extends around the upper surface of the base and is inset from the perimeter of the base.

When cones 65 are stacked one on top of another, the spacer formations 69 engage the underside of the base 65a of the cone above so that the bases 65a of the cones in the stack are separated providing a gap between the bases 65a. In use with the apparatus described above, the gap provides access for the gripping fingers 25 to support the cones 65 in the elevated position within the tower 11 as described previously. The cone 65 may be symmetrical about a vertical axis through the light unit 67. As a result, it may not be necessary to rotate the cone 65 to align the base 65a with the gripping fingers 25. In other embodiments, the cone may be asymmetrical about the vertical axis.

The spacer formations 69 also reduce the contact points/area between the bases 65a of the cones in the stack. As a result, the effect of frost etc sticking the bases 65a together may be reduced allowing the cones to be separated from the stack as described previously.

The invention is not limited to the embodiments above-described. Various modifications are shown in FIGS. 17 to 26. For convenience, like reference numerals are used for the same or similar parts and the arrangement and operation of such parts is the same as previous embodiments unless indicated to the contrary and is only repeated so far as necessary for an understanding of the modifications and the previous embodiments should be referred to for a more detailed description of such parts.

Figure 17:
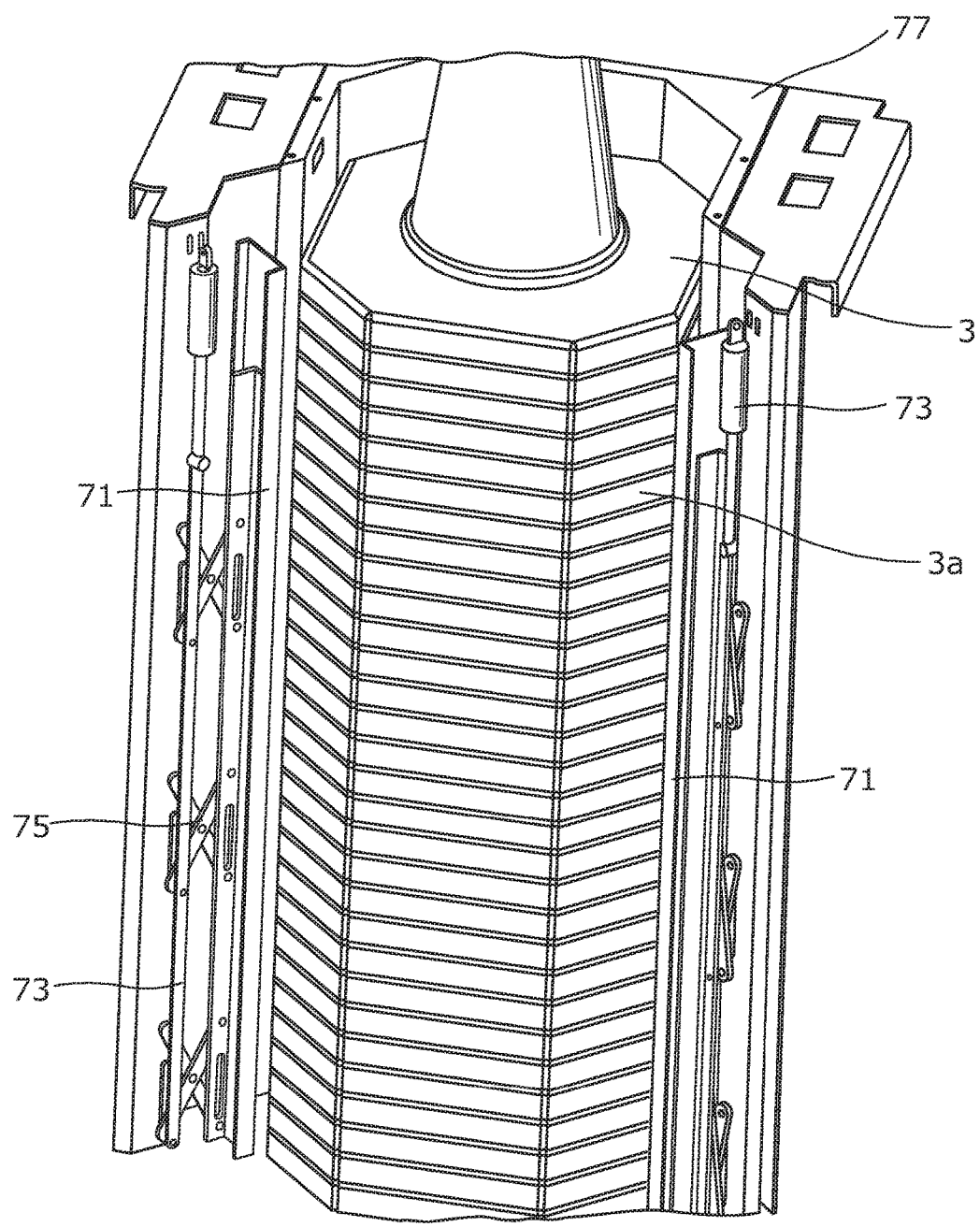
FIGS. 17 and 18 show a modification of the apparatus.
Figure 18:
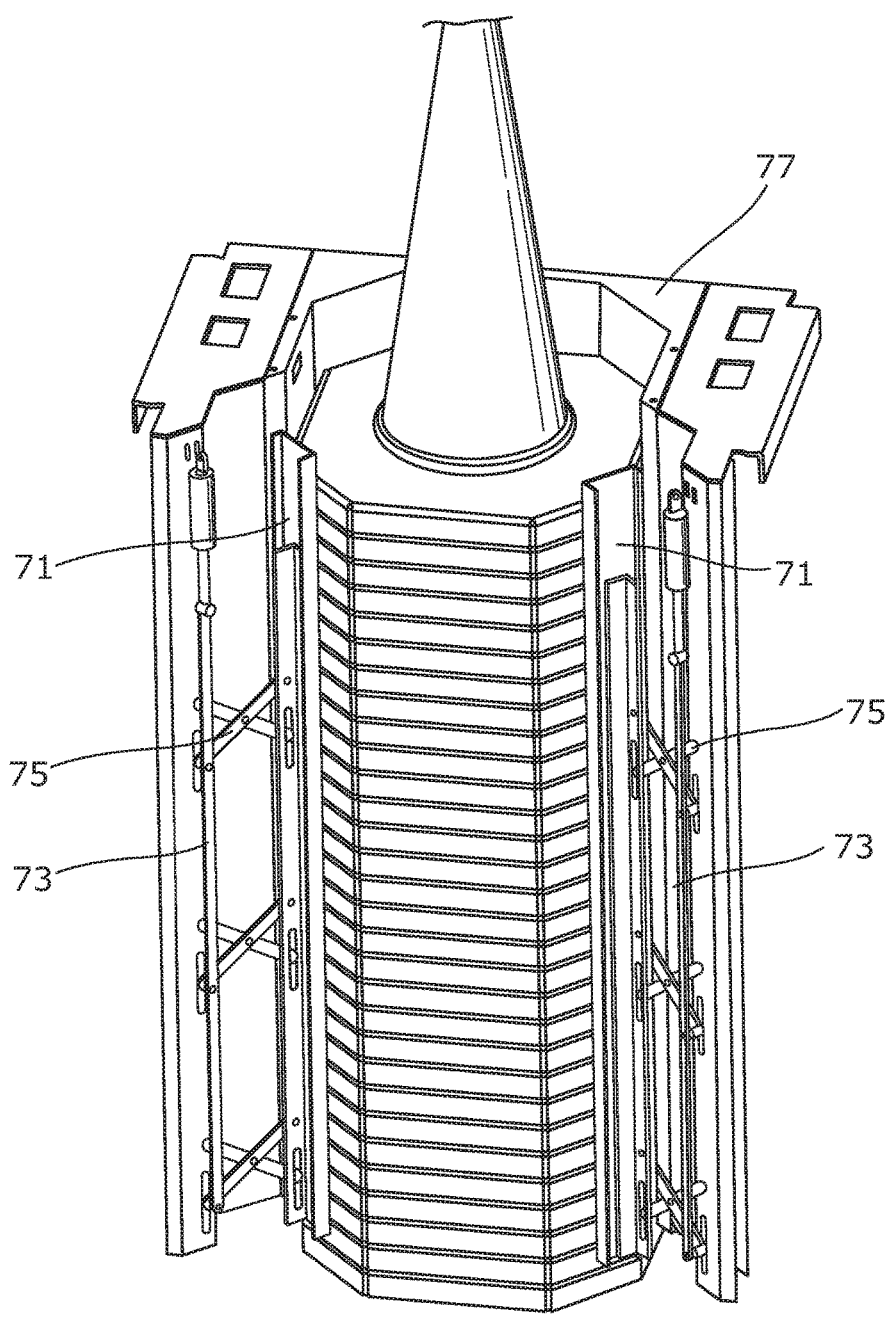

Referring to FIGS. 17 and 18, the gripping fingers 25 for holding cones 3 in an elevated position may be replaced by a set of clamping bars 71 movable between an open position and a closed position for engaging the base 3a of a cone 3 located between the clamping bars 71. In this embodiment there are two clamping bars but this is not limiting and the number of clamping bars may be altered, for example one o more clamping bars may be employed. The clamping bars 71 may be operated by any suitable means such as powered rams 73 and scissor linkages 75. To dispense cones 3, the platform 19 is moved to the upper transfer position to receive a stack of cones 3 from the flat bed storage area 7 (or a device for transferring stacks of cones between the flat bed storage area and the tower such as described later with reference to FIG. 19) with the clamping bars 71 in the open position (FIG. 17). The platform 19 then lowers the stack of cones a distance equal to the thickness of the base 3a of the cone 3 at the bottom of the stack (or multiples thereof if more than one cone is to be lowered by the platform 10) with the clamping bars 71 in the open position. The clamping bars 71 are then moved inwards to the closed position to engage the bases 3a of the other cones 3 in the stack that are held in a sleeve 77 in the elevated position when the platform 19 is moved to the lower transfer position with the bottom cone (or cones) from the stack for dispense onto the road as described previously. The platform 19 is then moved to the upper transfer position and the clamping bars 71 moved to the open position to release the stack of cones. The platform 19 is then lowered to move the bottom cone (or cones) below the clamping bars 71 and the clamping bars 71 moved to the closed position to engage the bases 3a of the other cones 3 in the stack and the platform 19 moved to the lower transfer position to dispense the bottom cone (or cones) onto the road as described previously. The above operation is repeated until all the cones in the stack have been dispensed. The platform 19 can then receive another stack of cones from the storage area 7. To retrieve cones, the platform 19 is arranged in the lower transfer position for transfer of a cone (or cones) from the road onto the platform as described previously. The platform is then moved to the upper transfer position. The clamping bars 71 are then opened and the platform 19 raised to position the base of the retrieved cone (or cones) between the clamping bars 71. The clamping bars 71 are then moved to the closed position to grip the base 3a of the cone 3 (or cones) and the platform moved to the lower transfer position to receive the next cone from the road. The above operation is repeated until a stack of cones has been reformed. The stack of cones can then be returned to the storage area 7. Dispensing and retrieving of the cones may be combined with fitting/removing lamps on the cones and/or washing the cones as described previously. As will be appreciated, the clamping bars 71 engage the edge of the cone base 3 to hold the cone in the elevated position and the bases of the cones in a stack of cones therefore do not have to be spaced apart. The clamping arrangement may be used with cones having spacers to separate the bases in a stack of cones and with cones without any spacers to separate the bases in a stack of cones.

Figure 19:
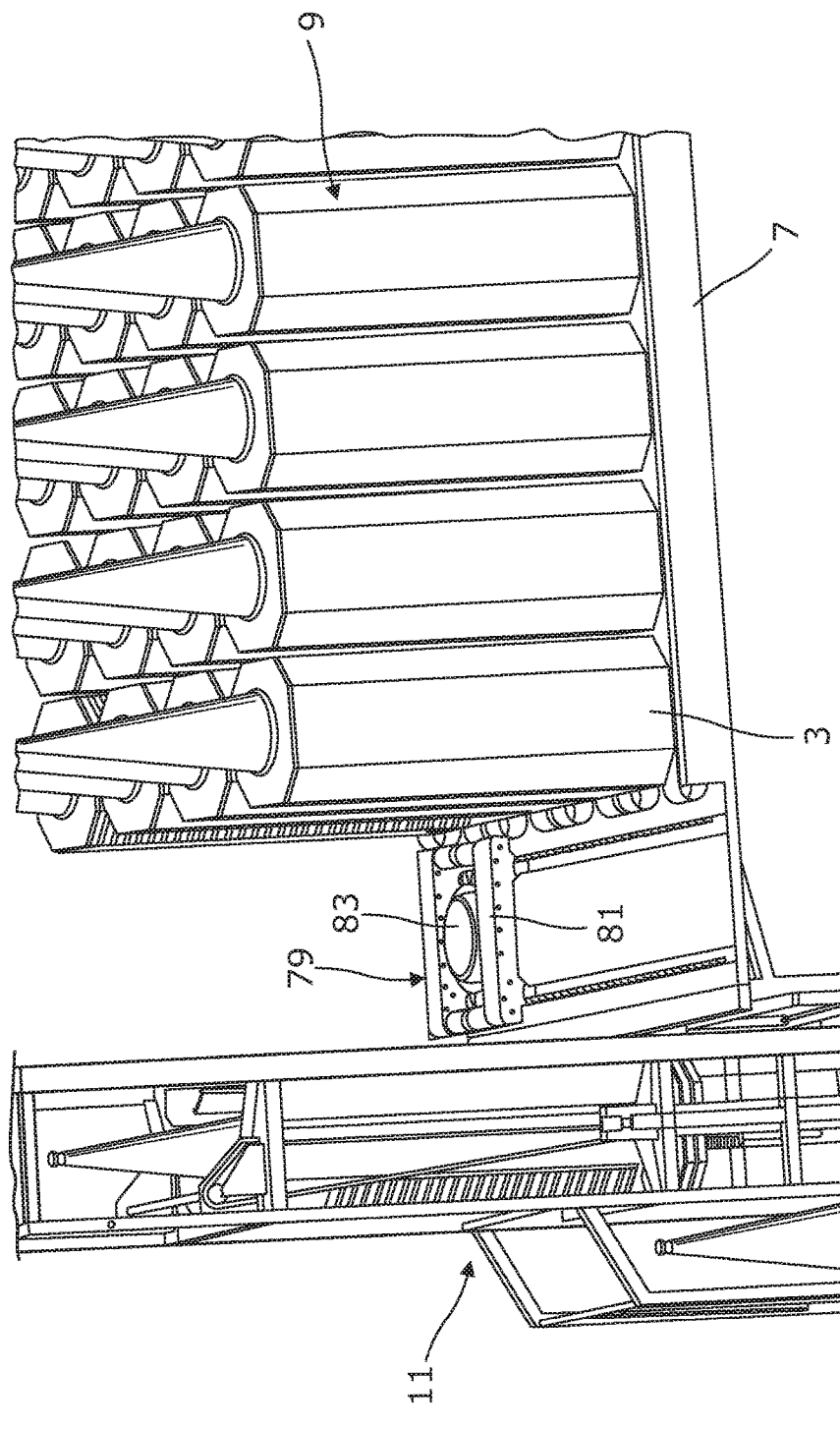
FIG. 19 shows another modification of the apparatus.
Figure 20:
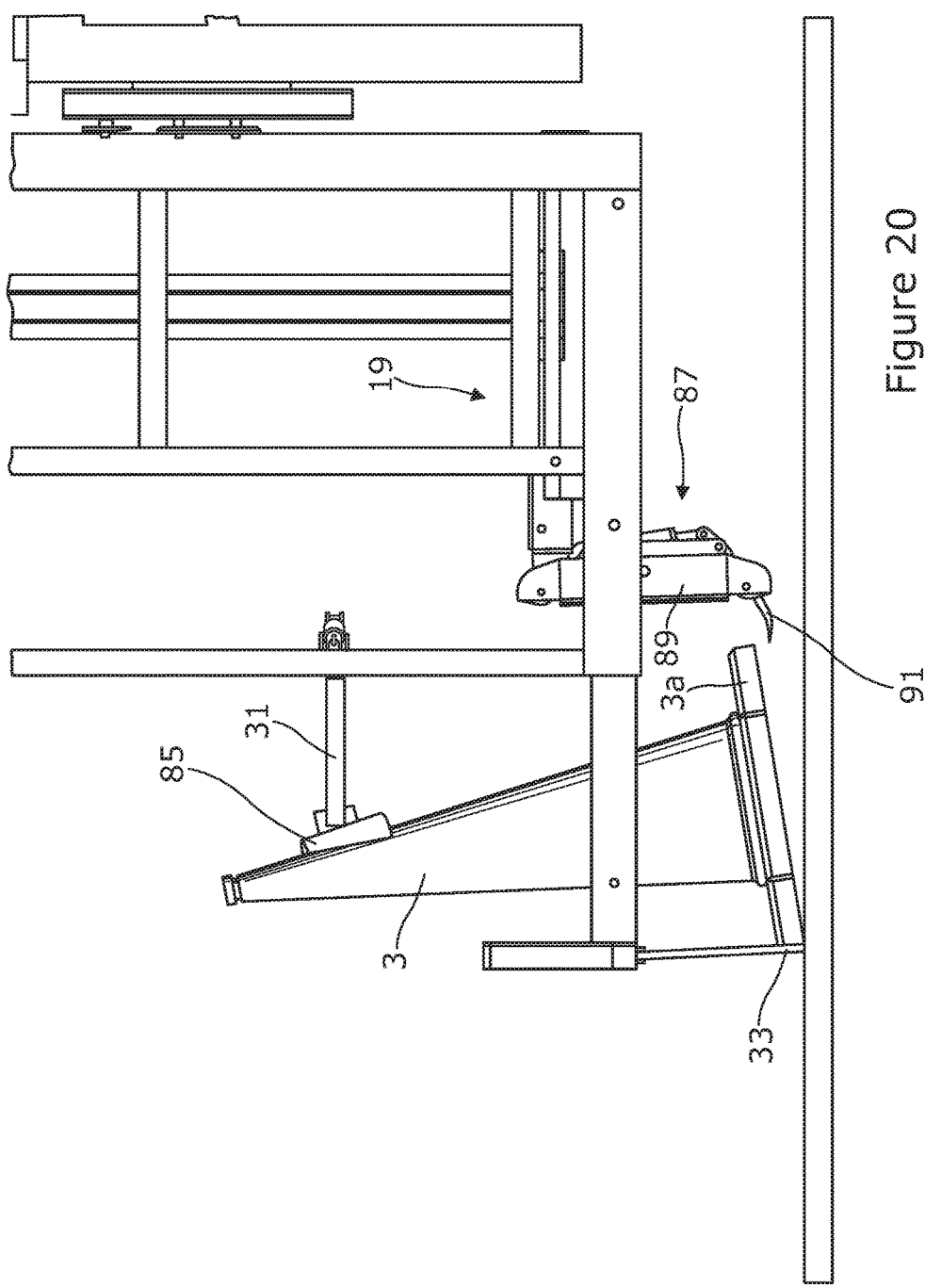
FIGS. 20 to 25 show another modification of the apparatus.
Figure 21:
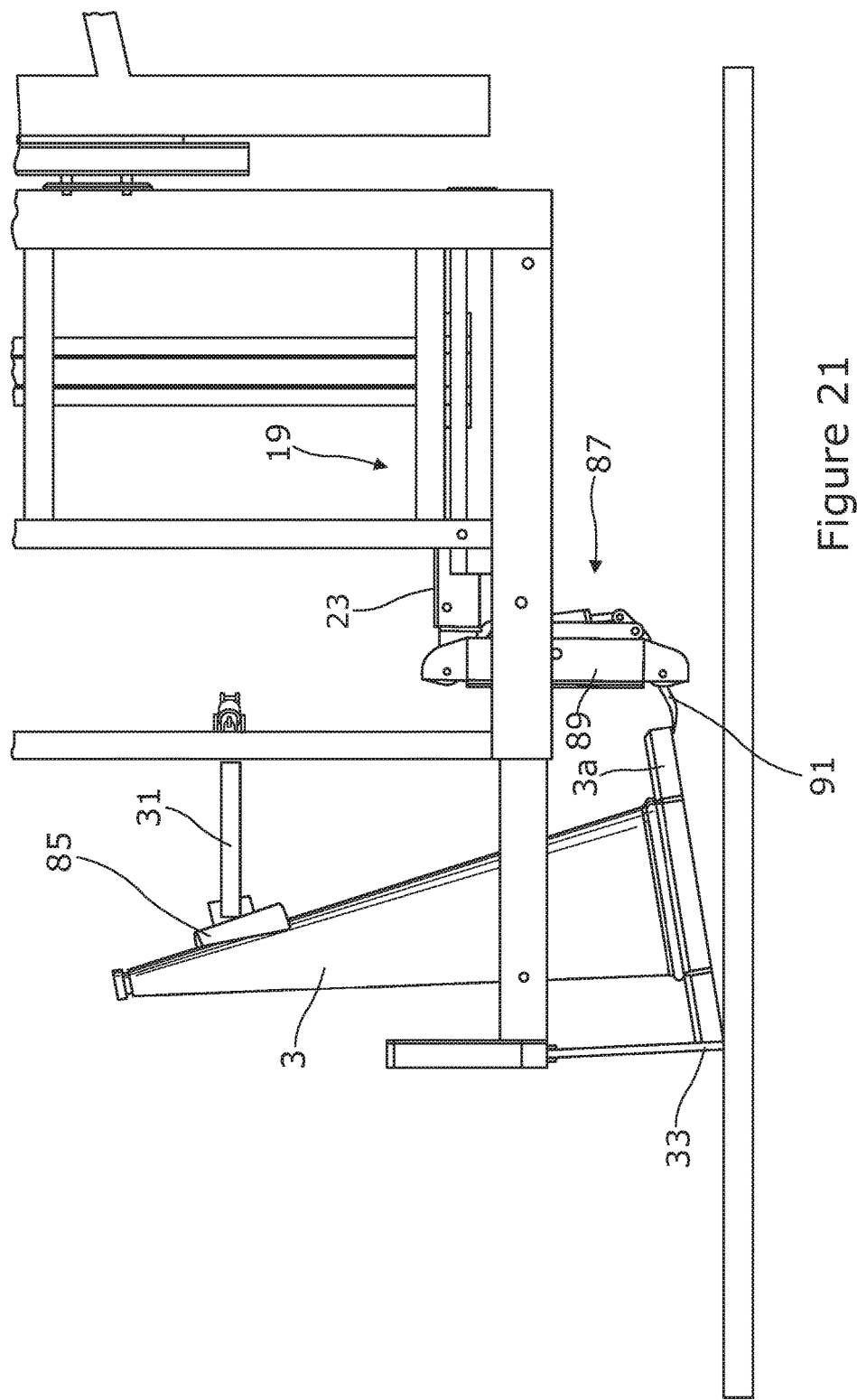
Figure 22:
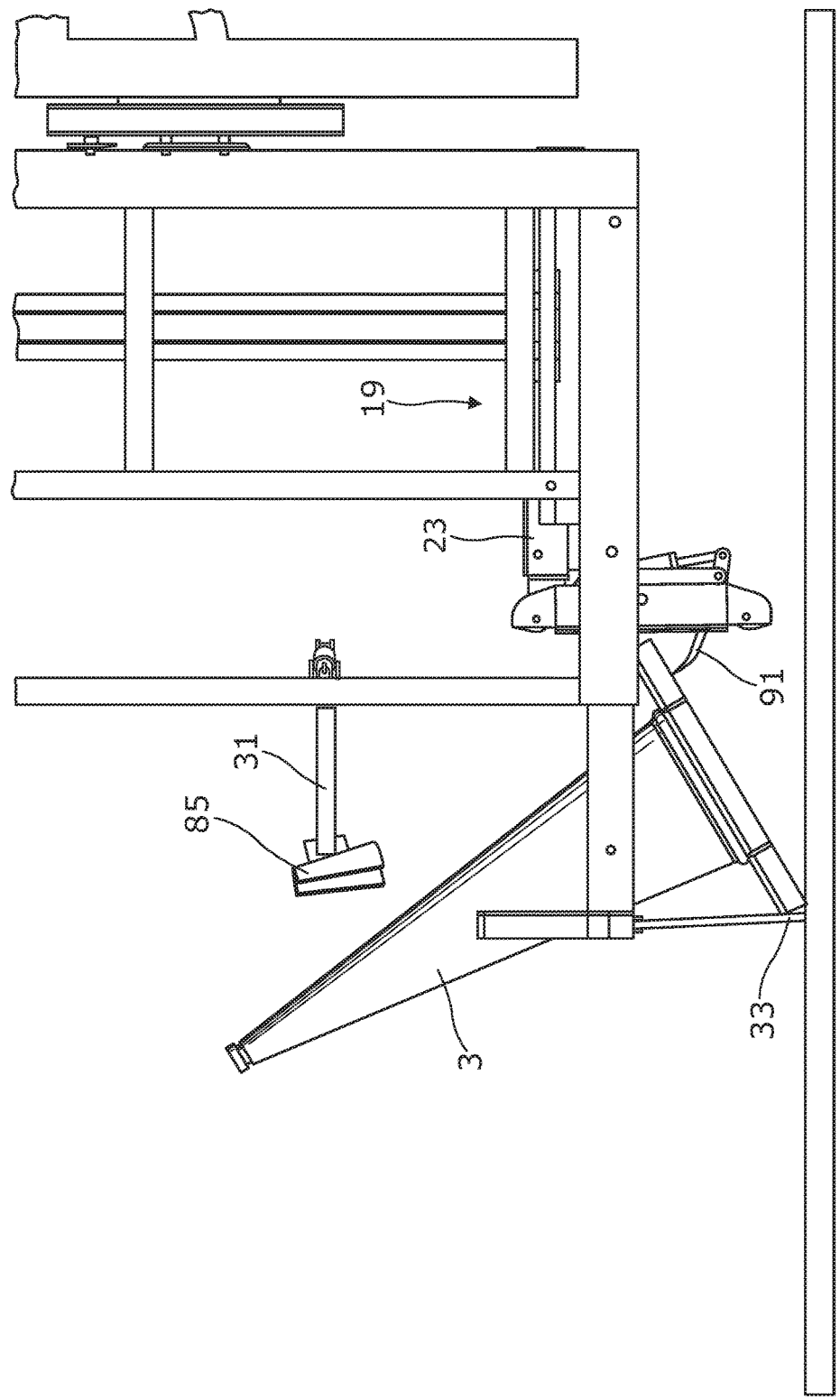
Figure 23:
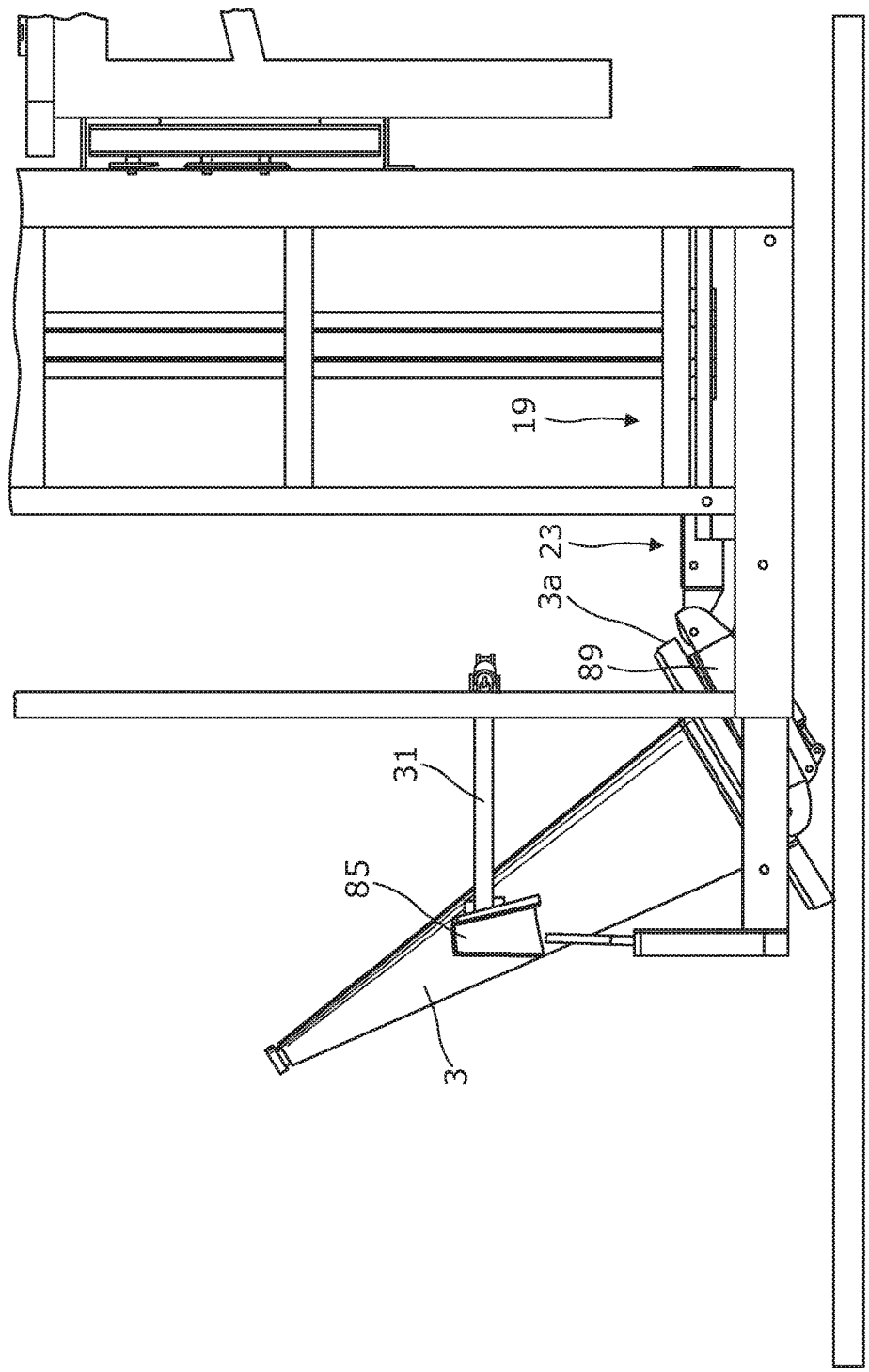
Figure 24:
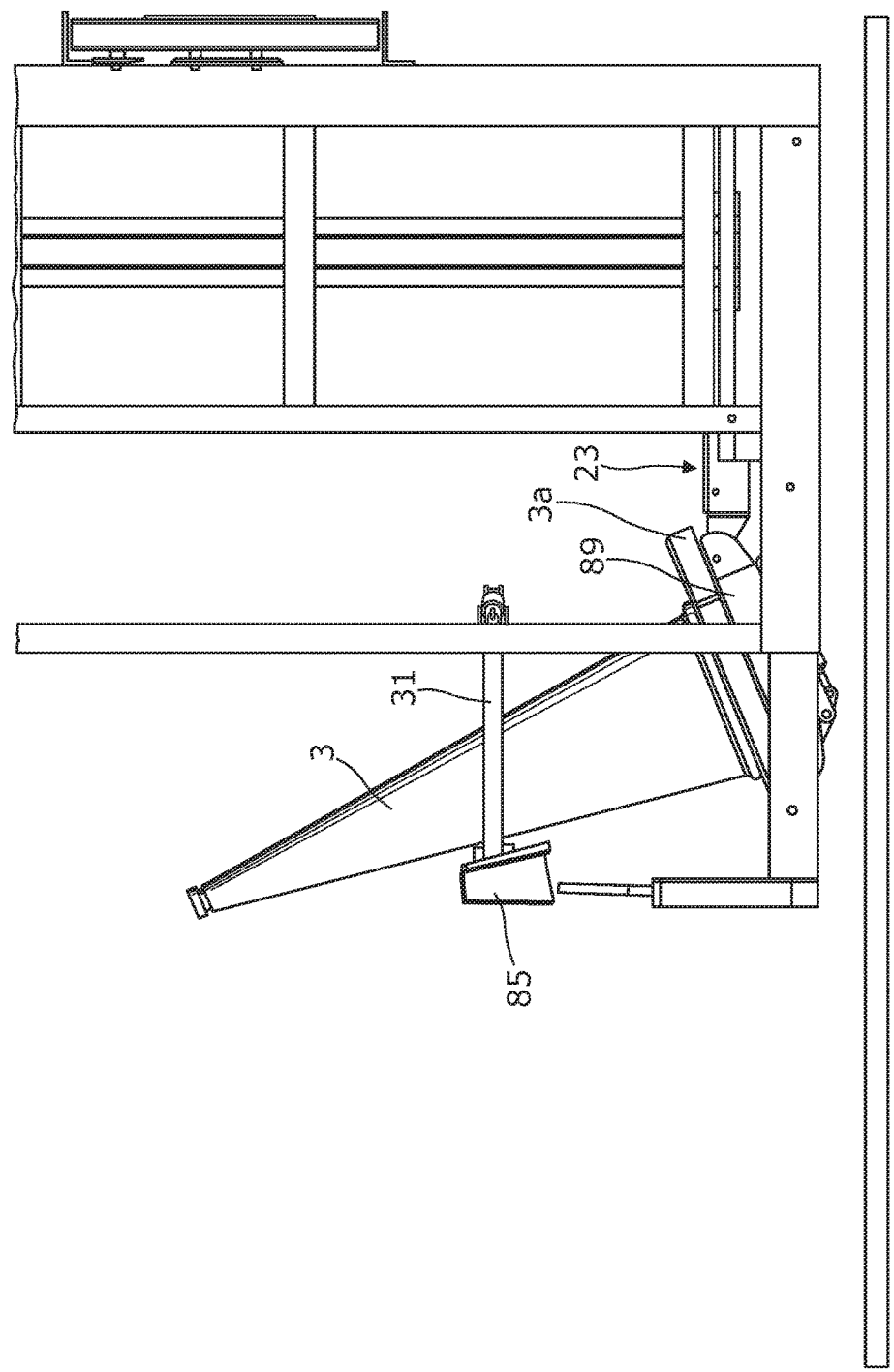
Figure 25:
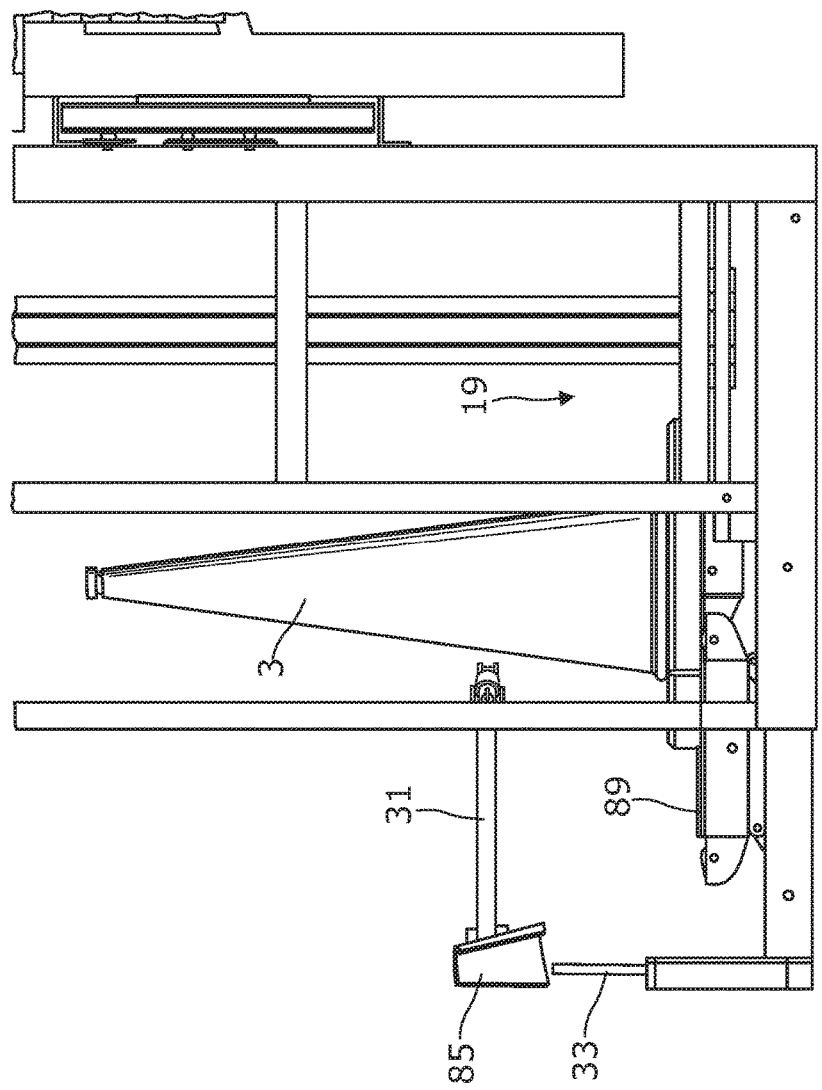

Referring now to FIG. 19, the flat bed storage area 7 may be provided with a device for moving cones between the tower and the storage area. In this embodiment, a shuttle 79 is provided at the rear end of the storage area 7. The shuttle 79 is movable from one side of the storage area 7 to the other side. When dispensing cones onto the road from the tower, the shuttle 79 can be positioned to align with the conveyor of any of the rows of stacked cones on the storage area. The conveyor is then operated to transfer one stack of cones to the shuttle 79. The shuttle 79 can then be moved to wherever the tower is dispensing cones to transfer the stack of cones to the tower without interrupting the dispensing operation. Similarly, when retrieving cones from the road into the tower 11, the shuttle 79 can be moved to wherever the tower is retrieving cones and transfer a stack of cones from the tower 11 back to the flat bed storage area 7 without interrupting the retrieving operation. Sensors (not shown) may be provided to align the shuttle 79 with the tower and conveyors. The shuttle 79 may have a conveyor 81 for transferring stacks of cones between the storage area 7 and the tower 11. The shuttle 79 may have a turntable 83 for rotating the stack of cones to the required orientation for transfer between the storage area 7 and the tower 11. The shuttle 79 may be used when loading/unloading the flat bed storage area 7. For example, when loading the flat bed storage area 7, the shuttle 79 may be positioned to receive a stack of cones to be loaded onto the flat bed storage area 7 and deliver the stack to the appropriate conveyor on the flat bed storage area 7. Similarly when unloading the flat bed storage area 7, the shuttle 79 may be positioned to receive a stack of cones from any of the conveyors on the flat bead storage area 7 and deliver the stack for unloading from the flat bed storage area 7. Loading/unloading may be provided by any suitable means such as a forklift truck.

Referring to FIGS. 20 to 25, the tilt bars 31 may be provided with features 85 that engage the upper part of a cone 3 and inhibit or prevent the cone 3 twisting or toppling to one side when it is tilted during the retrieval operation. For example feature 85 may be a cone shaped part or any other suitably shaped part. The platform 19 may be provided with a device 87 for assisting retrieval of a cone 3 from the road. The device 87 may include a conveyor section 89 and one or more levers 91 arranged to move under the cone 3 when it is tilted by the tilt arms 31 during the retrieval operation. The levers 91 rotate up and back towards the elevator 23, further tilting the cone 3, drawing it back and keeping it stabilised. This movement counters the movement of the reversing truck and reduces the tilting pressure on the top section of the cone 3 during the initial tilt and also assists the antiskid bars 33 in preventing the cone 3 from skidding on the road. The conveyor 89 also rotates up and assists the smooth transfer of the cone 3 onto the elevator. The conveyor 89 preferably aligns with the elevator 23 to transfer the cone 3 onto the elevator 23.

Figure 26:
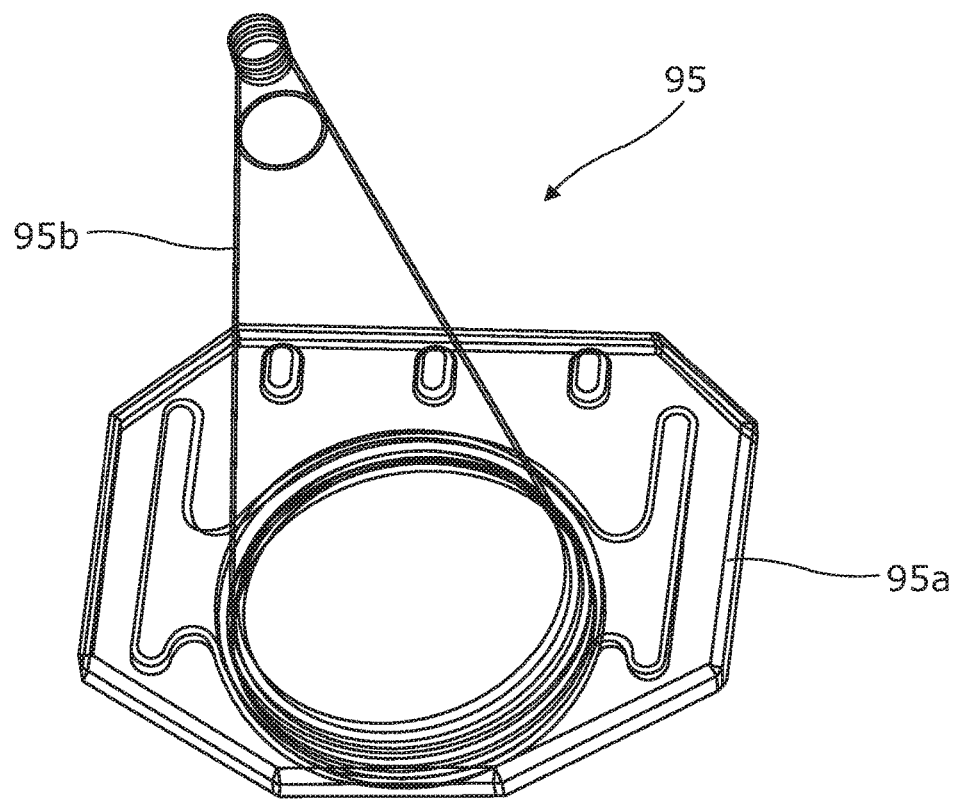
FIG. 26 shows another cone.

Referring now to FIG. 26, another cone 95 is shown. The cone 95 has a base 95a and a conical-shaped body 95b that is hollow and can be accessed through a central hole in the base 95a. The hole may taper in towards the top of the base 95a. The base 95a is generally rectangular in plan view with angled corners although the base 95a may have other shapes. The base 95a is offset relative to a vertical axis through the body 95b. The base 95a protrudes from the body 95b on three sides. Preferably one side of the base 95a protrudes from the body 95b to a greater extent than the opposed side. The opposed side may not protrude from the body 95b to any appreciable extent. When setting the cone 95 down onto the road, for example to close off a lane, the offset cone base 95a can be placed on the road with protruding side of the base 95a facing in towards the closed lane and the opposed side facing out towards the live lane. As a result, the possibility of the base 95a being driven over by passing traffic in the live lane is reduced compared to a regular based cone where the base protrudes on all side of the body and is not in the drivers line of vision, leaving the side facing towards the live lane prone to being driven over so that the cone is moved or knocked over. The cone may be used with the apparatus described herein which can set the cone down in the required orientation. The cone may include any of the features of any other embodiments.

Other modifications and changes that can be made within the concepts described herein will be apparent to those skilled in the art. Features of any of the embodiments may be employed separately or in combination with any other feature of the same or different embodiments without limitation.

The invention claimed is:

1. An apparatus for dispensing cones onto a surface and for retrieving cones from the surface, the apparatus comprising:
    a cone transfer device for transferring cones between a vehicle and the surface, the cone transfer device including a tower having a platform moveable to and from a lower transfer position for dispensing cones onto the road and for retrieving cones from the road; and
    a shuttle movable transverse to the direction of movement of the vehicle for transferring stacks of cones between a storage area and the tower;
    wherein the tower is configured to be mounted at a rear end of the vehicle and is movable transverse to the direction of the movement of the vehicle from one side of the vehicle to the other side.

2. The apparatus according to claim 1 wherein the platform is movable in a vertical direction between the lower transfer position and an upper transfer position for receiving cones from a storage area and for returning cones to the storage area.

3. The apparatus according to claim 1 wherein the tower includes a holding device for holding one or more cones in an elevated position and the platform receives and lowers cones released by the holding device in an elevated position for dispensing cones onto the road, and receives and raises cones retrieved from the road for retention by the holding device in an elevated position.

4. The apparatus according to claim 3 wherein the holding device is movable between a closed position for retaining one or more cones and an open position for releasing one or more cones.

5. The apparatus according to claim 3 wherein the holding device includes one or more gripping fingers or clamping bars for retaining one or more cones in the elevated position by engagement with a base of each of the one or more cones.

6. The apparatus according to claim 1 wherein the platform includes an elevator for positioning cones.

7. The apparatus according to claim 6 wherein the elevator adjusts a vertical and/or angular position of the cones.

8. The apparatus according to claim 1 including an alignment device for aligning cones to be retrieved with the platform.

9. The apparatus according to claim 8 wherein the alignment device comprises guide bars defining a channel for guiding cones toward the platform.

10. The apparatus according to claim 1 including a tilting device for tilting cones to be retrieved.

11. The apparatus according to claim 10 wherein the tilting device comprises one or more tilt bars configured to engage an upper end of each of the cones to tilt each of the cones for retrieving cones onto the platform.

12. The apparatus according to claim 1 wherein the tower can be raised and lowered relative to the vehicle.

13. The apparatus according to claim 1 wherein the storage area includes at least one conveyor for moving stacks of cones to and from the shuttle.

* * * * *